United States Patent [19]
Takada et al.

[11] Patent Number: 5,848,043
[45] Date of Patent: Dec. 8, 1998

[54] MODULATION OF LASER POWER IN ACCORDANCE WITH A LINEAR VELOCITY BY PULSE DIVISION SCHEMES

[75] Inventors: Ken' Ichi Takada; Takashi Ohno; Natsuko Nobukuni; Michikazu Horie; Haruo Kunitomo, all of Kanagawa, Japan

[73] Assignee: Mitsubishi Chemical Corporation, Tokyo, Japan

[21] Appl. No.: 626,029

[22] Filed: Apr. 1, 1996

[30] Foreign Application Priority Data

| Mar. 31, 1995 | [JP] | Japan | .................................... 7-100387 |
| Apr. 10, 1995 | [JP] | Japan | .................................... 7-84186 |
| Apr. 18, 1995 | [JP] | Japan | .................................... 7-116339 |
| Jul. 24, 1995 | [JP] | Japan | .................................... 7-187132 |
| Sep. 18, 1995 | [JP] | Japan | .................................... 7-238547 |
| Feb. 2, 1996 | [JP] | Japan | .................................... 8-17479 |

[51] Int. Cl.$^6$ .............................. G11B 7/00; G11B 11/10
[52] U.S. Cl. .................................. 369/116; 369/54; 369/59
[58] Field of Search .......................... 430/270.1; 369/283, 369/288, 284, 116, 54, 59

[56] References Cited

U.S. PATENT DOCUMENTS

| 5,561,656 | 10/1996 | Hurst, Jr. ................................. 369/116 |
| 5,568,464 | 10/1996 | Horie ....................................... 369/116 |

FOREIGN PATENT DOCUMENTS

| 63-103454 | 5/1988 | Japan . |
| 63-113938 | 5/1988 | Japan . |
| 1-116927 | 5/1989 | Japan . |
| 1-150230 | 6/1989 | Japan . |
| 1-253828 | 10/1989 | Japan . |
| 1-315030 | 12/1989 | Japan . |
| 2-87344 | 3/1990 | Japan . |
| 2-165420 | 6/1990 | Japan . |
| 2-198040 | 8/1990 | Japan . |

(List continued on next page.)

OTHER PUBLICATIONS

International Symposium on Optical Memory, pp. 33–34, 1995, Bor–Wen Yang, et al., "Readout Scheme by Pulsed Irradiation Center Aperture Detection on Magnetically Induced Super Resolution MO Disks."

The Japan Society of Applied Physics and Related Societies, 29a–B–4, p. 1014, 1982 N. Morishita, et al., "Study of Write Compensation Method in Phase Change Optical Disk".

Japanese Journal of Applied Physics, vol. 30, no. 4, pp. 677–681, April, 1991, Eiji Ohno, et al., "Multipulse Recording Method for Pulse–Width Modulation Recording on an Erasable Phase Change Optical Disk".

Japanese Journal of Applied Physics, vol. 31, no. 2B, pp. 584–589, February, 1992, Hisataka Sugiyama, et al., "Analysis of Leading Edge/Trailing Edge Independent Detection Method in Optical Disk".

Proc. Int. Symp. On Optical Memory, pp. 291–296, 1991, Kenichi Nishiuchi, et al., "Feasibility Study of Ge–Sb–Te Phase–Change Optical Disk Medium for One–Pass Overwrite Digital Audio Recording".

*Primary Examiner*—David C. Nelms
*Assistant Examiner*—Kim-Kwok Chu
*Attorney, Agent, or Firm*—Oblon, Spivak, McClelland, Maier & Neustadt, P.C.

[57] ABSTRACT

An optical recording process for recording data on a recording medium of phase-change type employs laser power modulation scheme for mark-length modulation recording. The process selects one of pulse division schemes for modulating the laser power in accordance with a linear velocity on the disc. The recording laser includes m pulses for nT mark having a power level Pw and a duration of $\alpha_i T$, with m intervals $\beta_i T$ sandwiched therebetween, wherein on condition that $m=n-k$ and $\Sigma\alpha_i+\Sigma\beta_i=n-j$, $\alpha_i$ or bias power $Pb_i$ is changed in accordance with the linear velocity, $Pb_i$ being a bias power level for modulation, k and j being an integer and a real number, respectively, both selected between 0 and 2. A large range of the linear velocity margin can be obtained for the disc without changing either the composition of the phase-change material or multi layer structure on the disc.

14 Claims, 21 Drawing Sheets

FOREIGN PATENT DOCUMENTS

| | | |
|---|---|---|
| 2-199628 | 8/1990 | Japan . |
| 3-3168 | 1/1991 | Japan . |
| 3-88124 | 4/1991 | Japan . |
| 4-212735 | 8/1992 | Japan . |
| 4-313816 | 11/1992 | Japan . |
| 5-62193 | 3/1993 | Japan . |
| 5-325258 | 12/1993 | Japan . |
| 6-4867 | 1/1994 | Japan . |
| 7-37251 | 2/1995 | Japan . |

EXAMPLE 2

MARK LENGTH VS RECORDING POWER

EXAMPLE 2

3T JITTER VS RECORDING POWER

EXAMPLE 3

MARK LENGTH VS RECORDING POWER

EXAMPLE 3

3T JITTER VS RECORDING POWER

EXAMPLE 4
MARK LENGTH VS RECORDING POWER (m = n)

EXAMPLE 4
3T JITTER VS RECORDING POWER (m = n)

EXAMPLE 7

EXAMPLE 8

MgS(40)-SiO$_2$(60)

EXAMPLE 9

CaS(40)-SiO$_2$(60)

EXAMPLE 10

$La_2S_3(80) - SiO_2(20)$

EXAMPLE 11

$La_2S_3(60) - SiO_2(40)$

EXAMPLE 12

$Ce_2S_3(20) - SiO_2(80)$

EXAMPLE 13

$TaS_2(20) - Y_2O_3(80)$

EXAMPLE 14

$TaS_2(20) - Ta_2O_5(80)$

EXAMPLE 15

$TaSe_2(20) - Ta_2O_5(80)$

EXAMPLES 17 AND 18

TaS$_2$ + Ta CO SPUTTER

COMPARATIVE SAMPLE 4
$Ta_2O_5$

COMPARATIVE SAMPLE 5
$ZnS(80)-TiO_2(20)$

COMPARATIVE SAMPLE 6

ZnS(80) MoS$_2$(20)

MODULATION OF LASER POWER IN ACCORDANCE WITH A LINEAR VELOCITY BY PULSE DIVISION SCHEMES

BACKGROUND OF THE INVENTION (a) Field of the Invention

The invention relates to an optical recording medium and an optical recording process and, more particularly, to a recording process which enables a broad range of linear velocities for use with an optical recording medium of phase change type, in which information can be recorded, erased, or reproduced by irradiation of laser radiation or the like.

(b) Description of the Related Art

Recently, extensive efforts have been paid in developing optical discs utilizing laser radiation to thereby provide a recording medium which satisfies the demands toward a higher amount of information processed, and a higher density as well as a higher speed of recording and retrieval. Recordable optical discs includes a write-once type which enables a recording operation only once, and an overwrite type which permits repeated recording and erasure as many times as desired. Optical discs of overwrite type includes magneto-optical recording medium which utilizes a magneto-optical effect, and a medium of phase-change type which utilizes a reversible phase-change between crystalline and amorphous states.

A recording medium of phase-change type does not require an external magnetic field, and enables a simultaneous recording/erasure only through a modulation of the power of laser radiation. It also has an advantage in that a one-beam overwriting operation is enabled in which a single beam is used to perform an erasure and rewriting concurrently.

In a one-beam overwritable disc of phase-change type, a recorded mark is generally formed and erased by amorphization and recrystallization, respectively, of an $\mu$m size portion of a recording film. As the recording film for use in the disc of phase-change type, a chalcogen-rich alloy film is generally used. Examples of the alloy include Ge—Te, Ge—Te—Sb, In—Sb—Te and Ge—Sn—Te rich alloys.

In a recording medium of phase-change type, two levels of laser power are generally used for implementing such two distinctive states as crystalline and amorphous. As an example, a conventional method will be described in which a mark is formed by amorphization applied to an initial state of crystallization, and followed by erasure by a subsequent amorphization. The crystallization, i.e., erasing is performed by a heat treatment of a recording layer at a temperature higher than the crystallization temperature and lower than the melting point of the recording layer. In this case, the cooling rate of the recording layer is controlled to be sufficient low so that crystallization may be finished in the structure of the recording layer sandwiched by insulator layers or the process using an ellipse laser beam having a major axis extending along the rotational direction of the disc, i.e., along the scanning direction of the laser beam.

On the other hand, amorphization, i.e., overwriting is performed by a heat treatment of the recording layer at a temperature higher than the melting point thereof, followed by supercooling of the molten recording layer. For a recording medium of phase-change type, one-beam overwriting is performed by erasure of a recorded mark and a concurrent recording, wherein the recording laser pulse is modulated between the levels of a recording laser power Pw and a erasing laser power Pe. In this process, the insulator layers as mentioned above function as heat dissipation layers for achieving a sufficient cooling or quenching speed. The insulator layers also have functions for preventing deformation of the recording layer due to melting or volume change during the heating or cooling step, a thermal damage of the substrate, and degradation of the recording layer due to moisture. The material for the insulator layer is selected in the viewpoint of transparency for laser light, high melting, softening and high decomposing points, easiness for manufacturing, and a suitable heat conductivity.

In the recording medium of phase-change type as described above, since the thermal process during recording and erasing is significantly affected by the scanning speed of laser beam, i.e., linear velocity on a disc, composition of the recording layer and multilayer structure thereof should be optimized for the linear velocity on the disc in order to improve recording and erasing performance. Formation of an amorphous mark is generally performed by melting an $\mu$m-size portion of a recording layer by irradiation with a recording power, followed by cooling at a rate higher than a critical cooling rate. In detail, a high cooling rate is effected by a high linear velocity, while a low cooling rate is effected by a low linear velocity.

To confirm the linear-velocity dependence of cooling rate, a simulation of thermal distribution was performed utilizing a general differential method applied to a disc consisting of 100 nm thick ZnS—$SiO_2$ mixed film, 25 nm thick GeSbTe recording layer, 20 nm thick ZnS—$SiO_2$ mixed film and 100 nm thick Al alloy film consecutively formed on a polycarbonate substrate, as also used in an embodiment of the invention. The simulation used irradiation of the disc with a recording power Pw and a erase power Pe having theoretical levels. It was determined that a cooling rate is several K/nsec or greater for a linear velocity of 10 m/s or greater, 2.2 K/nsec for 4 m/s, and 0.9 K/nsec for 1.4 m/s, at a point which is 0.1 $\mu$m ahead from the location where the pulse irradiation is initiated, in the vicinity of the melting point (600° C.) thereof during the down fall of the temperature after the recording layer has once reached a maximum temperature of 1,350° C.

To erase an amorphous mark, it is necessary that the recording layer be maintained for a given time interval at a given temperature above crystallization temperature and below the melting point. This time interval during which the recording layer should be maintained at a given temperature tends to be smaller for a higher linear velocity, and larger for a lower linear velocity. Accordingly, when the irradiation by a focussed laser beam takes place in a recording system having a relatively high linear velocity, it follows that a thermal distribution of the recording layer will be temporally and spatially, relatively steep in the portion thus irradiated, thereby leaving a concern for a failure of erasure which is desired. To accommodate for such recording system having a relatively high linear velocity, an alloy having a composition which provides a relatively rapid crystallization speed is used for the recording layer, and/or a multilayer structure is employed which suppresses heat dissipation so that a crystallization or erasure takes place within a relatively short time interval.

Conversely, when a recording system having a relatively low linear velocity is used, the cooling rate will then be suppressed, leaving a concern that a recrystallization may occur during a recording operation. To accommodate for such recording system having a relatively low linear velocity, an alloy having a composition which provides a relatively low crystallization speed is employed for the recording layer, and/or a multilayer structure which promotes heat dissipation is employed as means to prevent a recrystallization while an amorphous mark is being formed so that an intended mark length may be obtained.

Specifically, for use with a recording medium which is used at a high linear velocity, a multilayer structure is employed in which the thickness of a thermal insulation layer located between the recording layer and a reflecting layer is increased to suppress heat dissipation into the reflecting layer. A corresponding choice may be made in the material used. By way of example, where GeSbTe alloy is used, a composition such as a GeTe—$Sb_2Te_3$ line or above is employed which promotes a recrystallization. On the other hand, for use with a recording medium used at a low linear velocity, the thickness of the thermal insulation layer is reduced to promote a heat dissipation into the reflecting layer. A corresponding choice may be made such that an increased amount of Sb is used than the amount when applied to a recording medium having a high linear velocity, so as to suppress the recrystallization during the solidification.

It is possible, as mentioned above, to achieve an acceptable response in recording, erasing and retrieving information with an intended system by optimizing the composition of the recording layer and/or the multilayer structure. However, for a recording medium which is optimized for use with a recording system having a relatively high linear velocity, it is necessary that the crystallization speed be increased, which in turn prevents its use in a low linear velocity region because the resulting recrystallization stands in the way to forming an amorphous bit. Conversely, when the medium is optimized to a low linear velocity, the resulting composition and/or multilayer structure to forming an amorphous bit causes a difficulty of erasure at a high linear velocity. Thus, it is concluded that an optimization of recording medium alone cannot increase a margin of linear velocities for the recording medium.

Recently, it is noted that the linear velocity of the medium which is used during the recording or erasing operation has increased in order to reduce the length of time required for the recording or erasing operation. On the other hand, there is a need to make a record of information in accordance with a real time, as when recording a video, music or the like. In addition, there is an application in which a recording made according to a real time be edited later at a higher rate. In addition, if provision can be made to enable a common medium to be used in a relatively low linear velocity (in a range from 1.2–1.4 m/s and up to four to six times such range) application as experienced with recordable CD's as well as in a high linear velocity application as occurs in a current magneto-optical disc (on the order of 10 m/s or higher), such recording medium will be preferred for multimedia use.

If it is attempted to satisfy such needs by simply performing a recording operation at a linear velocity which is far below the linear velocity for which the multilayer structure and/or composition of the recording layer of the recording medium is optimized, there results a failure of recording an intended mark length due to the occurrence of a recrystallization, thus disabling recording of information. With a recording medium of phase-change type, a recording layer is irradiated by a focussed laser beam to locally melt it, whereupon it is quenched, thereby forming an amorphous mark. However, when the disc has a relatively low linear velocity, the recrystallization occurs subsequent to the melting which is produced for purpose of recording as mentioned above, which presents difficulty to the formation of a satisfactory amorphous mark, and it is believed that this explains for the above failure.

Retrieval of a recorded mark at which the crystallization has occurred subsequently to the melting during the recording operation presented a waveform, as graphically shown in FIG. 1. The reflectivity is not satisfactorily low in the front half of the recorded mark. This means that the recrystallization occurs dominantly in the front half of the recording mark, while an amorphous mark is formed in a relatively favorable manner in the rear portion of the mark as illustrated in FIG. 2. This can be explained as a result of the continuous irradiation of the laser beam at a level corresponding to the recording power, which transfers heat generated by laser irradiation on a region corresponding to the rear half of the mark, by heat conduction, to a region corresponding to the front half of the mark which has once been melted, with consequence that the front half of the mark cannot be quenched to allow the recrystallization. This problem becomes more significant in the recording of mark-length modulated information, where relatively longer marks are included.

For the rear end of the mark, the irradiation of the laser beam is no longer continued at a level corresponding to the recording power immediately upon termination of the irradiation of the rear end, and hence there is no conduction of undesired heat, thus allowing the portion which is melted to be amorphous. In consideration of this, it is found that if the power level is reduced after the initiation of the irradiation at the recording power, or if the recording pulse is divided, the recording layer will experience a temporal temperature change which is more in the nature of quenching, thus preventing a degradation in the mark which is caused by the recrystallization during the recording operation.

Examples of the recording process which utilizes such observation are disclosed in Japanese Laid-Open Patent Publications No. 165,420/1990, No. 212,735/1992, No. 62,193/1993, No. 325,258/1993, No. 116,927/1989 and JJAP. vol. 30, No.4 (1991) pp 677–681. A recording process which utilizes an off-pulse is disclosed in Extended Abstracts (40th Spring Meeting); the Japan Society of Applied Physics and Related Societies, 29a-B-4, and Japanese Laid-Open Patent Publication No. 37,251/1995, No. 4,867/1994, No. 253,828/1989, No. 150,230/1989, No. 315, 030/1989 No. 313,816/1992, No. 199,628/1990 and No. 113,938/1988. However, these processes employ a fixed divided pulse technique regardless of the linear velocity, and accordingly while they are effective in recording with a linear velocity in a given limited range, a favorable recording is frequently prevented under the condition in which the linear velocity is largely different from the given range. As long as a fixed divided pulse technique is employed, there is a limitation upon a range of linear velocities, which can be accommodated for a single fixed medium with a fixed composition of a recording film and a fixed multilayer structure.

SUMMARY OF THE INVENTION

In view of foregoing, it is an object of the present invention to provide an optical disc recording process for recording data on a recording medium of phase-change type, wherein data marks can be effectively overwritten over a wide range of linear velocity.

It is an alternative object of the present invention to provide an optical disc recording process for recording a single fixed disc by a variety of disc drives which have different linear velocities ranging in a wide range.

It is another alternative object of the present invention to provide an optical disc recording process for recording a Zoned Constant Angular Velocity disc in which the linear velocity varies with the zones fixed to a specific radius range.

It is a further object of the present invention to provide an optical disc and a recording medium drive suited for the process as described above.

To solve the problems discussed above, we hereby propose a variable divided pulse technique systematically varied for various linear velocities during overwriting. We have successfully extended a margin of linear velocities which are usable with a single fixed disc by the invention. Specifically, as the linear velocity is decreased, the invention provides for a rapid heat dissipation to promote amorphization, thus allowing a divided pulse technique to be specified in accordance with the linear velocity. Accordingly, the invention resides not in the technique of dividing the recording pulse itself, but in the technique of changing the divided pulse technique systematically in accordance with the linear velocity.

Thus, the invention provides an optical recording process for recording data in or erasing data from an optical information recording medium through a formation or erasure of optically distinguishable amorphous marks by irradiating with a focussed laser beam having laser power modulated by at least three levels in accordance with a clock period T, the process including the steps of:

providing a linear velocity V ranging between $V_L$ and $V_h$ on an optical recording medium, the clock period T being varied in accordance with the linear velocity V;

irradiating with a focussed laser beam to record a mark having an nT mark length on the optical recording medium in a mark length modulation recording; and modulating the laser irradiation to have m individual pulses each having a recording power level Pw and a pulse duration $\alpha_i T$, with an interval $\beta_i T$ provided between corresponding two of the pulse durations for providing a bias power level $Pb_i$, the i representing integers 1 to m, whereby obtaining a time sequence of $\alpha_1 T, \beta_1 T, \alpha_2 T, \beta_2 T, \ldots, \alpha_m T$ and $\beta_m T$ for the laser power.

the improvement wherein the recording process includes the step of changing at least one of a combination of $\alpha_i T$'s and Pb in accordance with the linear velocity V on condition that the following inequality and equalities are satisfied:

$n_{min} - k \geq 1$;

$m = n - k$; and $\alpha_1 + \beta_1 + \ldots + \alpha_m + \beta_m = n - j$, wherein k and j represent an integer which satisfies $0 \leq k \leq 2$ and a real number which satisfies $0 \leq i \leq 2$, respectively, and wherein $n_{min}$ represents a minimum value of the n.

Further, the invention provides an optical recording medium of phase-change type comprising a substrate, and a bottom dielectric protective layer, a recording layer substantially composed of $[(GeTe)_y(Sb_2Te_3)1-y]_{1-x}Sb_x$, given x and y satisfying $0 \leq x < 0.1$ and $0.2 < y < 0.9$, respectively, or $[M_y(Te_{1-x}Sb_x)_{1-y}]$, given y and x satisfying $0 \leq y < 0.3$ and $0.5 < x < 0.9$, respectively, M representing at least one element selected from a group consisting of In, Ga, Zn, Ge, Sn, Si, Pb, Co, Cr, Cu, Ag, Au, Pd, Pt, S, Se and O, a top dielectric protective layer and a metallic reflecting layer consecutively formed on the substrate, the recording layer having a film thickness of 15–30 nm and the top dielectric protective layer having a film thickness of 10–30 nm.

Furthermore, the invention provides a recording apparatus for use for an optical recording medium of phase-change type as mentioned above, which reads the pulse division information previously entered in a disc and performs a recording in the recording medium according to a specified mark length modulation scheme.

By using the recording process according to the invention, a margin of linear velocities usable with a single fixed recording medium can be extended, in particular toward the lower linear velocities, without changing a recording medium, thus enabling an overwrite recording over an extended range of linear velocities. Alternatively, a common medium can be used with a variety of disc drives, having different linear velocities during the recording operation while maintaining a compatibility of format of recorded data, thus overcoming the problem of compatibility between discs which are specialized with a respective specific linear velocities.

BRIEF DESCRIPTION OF THE DRAWINGS

FIG. 10A is an oscillograph for showing reproduced signal in Example 1, while

DESCRIPTION OF THE PREFERRED EMBODIMENTS

A recording process which utilizes a substantially constant linear velocity includes a popular CLV (constant linear velocity), ZCLV (zoned CLV) in which the linear velocity remains constant for each zone, or the like (see "Optical Disc Technology" supervised by Morio Onouye, and published from Radio Engineering Co.) In ZCLV technique, the linear velocity is slightly changed within a zone while is maintained substantially constant as a whole. At the present status, providing a variable linear velocity for CD which remains within a single multiple range (1.2 m/s to 1.4 m/s) belongs to the prior art.

For a given linear velocity $V_h$, the length of a bit into which the bit is written is determined by a mark length $nT_h$. When it is desired to write a mark of the same length at a lower linear velocity $V$ ($V<V_h$), there should be obtained a mark of the same length if a reference clock period T is used which is calculated to be equal to $(V_h/V) \times T_h$. An adjustment of clock period "T" in accordance with the linear velocity as mentioned is a known general practice. However, as a matter of practice, a desired mark length cannot always be obtained due to an enlargement of the mark length caused by a thermal diffusion or a reduction in the mark length caused by the recrystallization. Such occurrence is likely to be found where the minimum linear velocity $V_L$ remains in a lower range less than around 4–6 m/s.

Figure 1:
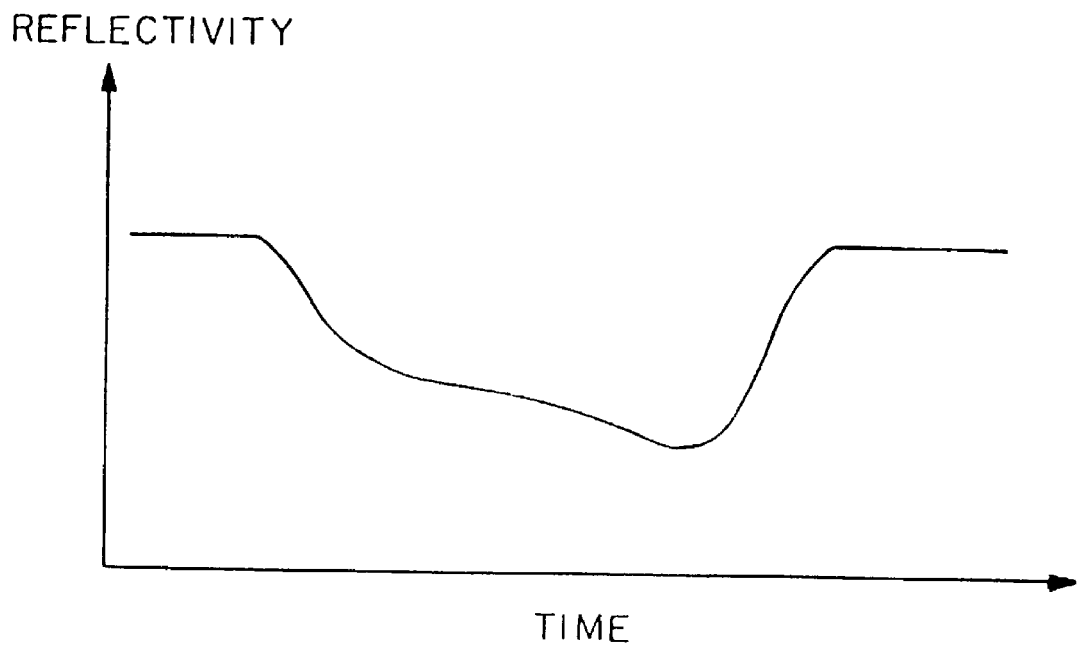
FIG. 1 is graph showing reflectivity of a portion of a recording layer partially recrystallized after melting to form an amorphous mark in a conventional method.
Figure 2:
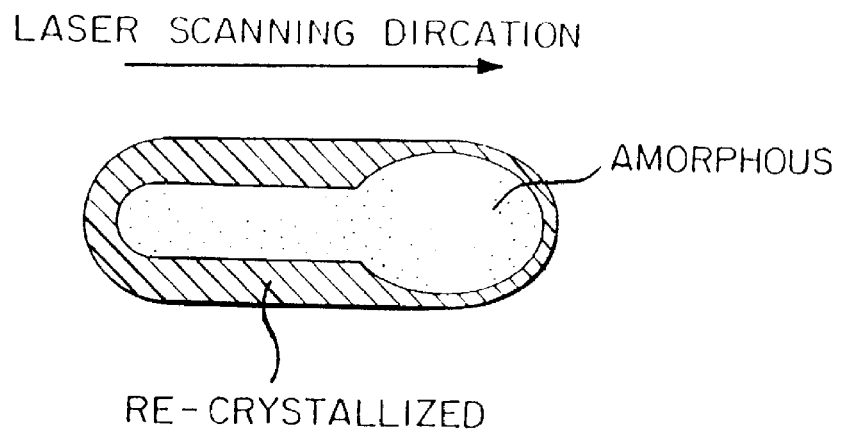
FIG. 2 is a schematic horizontal view of the portion of the recording layer of FIG. 1.
Figure 3:
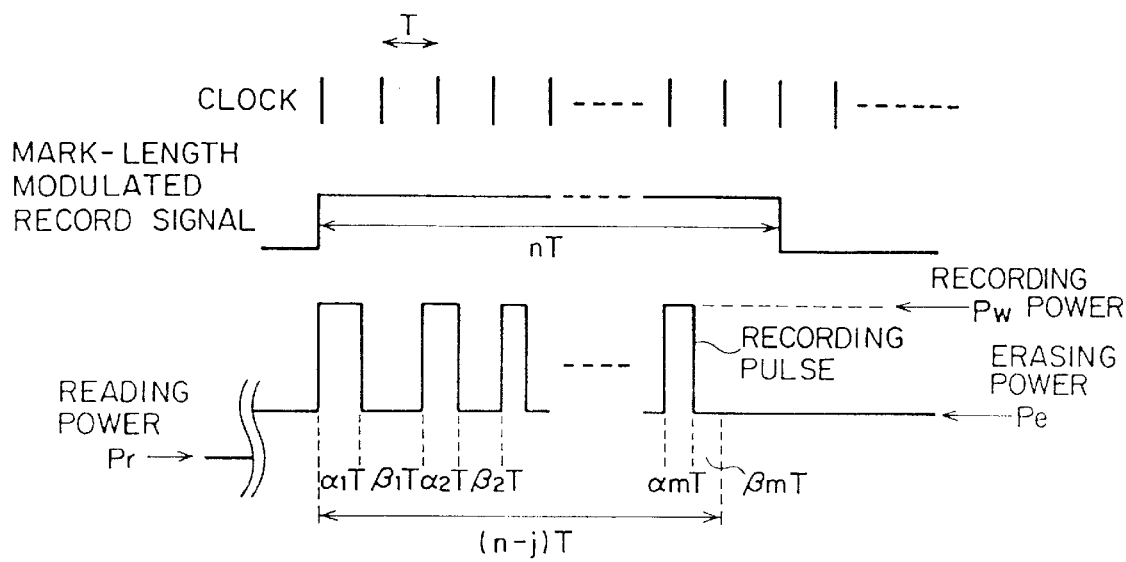
FIG. 3 is a timing chart of mark-length modulated pulses for recording an nT mark in accordance with a principle of a general method as used also in the invention.

Accordingly, there arises the necessity of regulating a temperature distribution within the recording layer by dividing the recording pulse into individual pulses to obtain a small width of the individual pulses. A recording process which utilizes such mark length modulation is illustrated in FIG. 3. A technique which utilizes such a modulation of the mark length includes 1–7 modulation, EFM modulation and the like. In a record of such mark lengths, the positions of the leading edge and the trailing edge of a recorded mark are of importance since they correspond to the data recorded. The edges are detected in reference to a window of each clock period of T.

In the present invention, at least one of the parameters of bias power level Pb and a combination of parameters $\alpha_i$'s which determine the divided pulse technique in the invention is changed in accordance with the linear velocity on th record disc, wherein the combination of $\alpha_i$'s is determined by a pulse division which includes m divided individual pulses having a recording power Pw and pulse duration $\alpha_i T$ ($1 \leq i \leq m$) with intervals $\beta_i T$ between each two of the individual pulses, wherein:

$$m = n-k, \; n_{min}-k \geq 1, \text{ and}$$

$$n-j = (\alpha_1 + \beta_1 + \ldots + \alpha_m + \beta_m),$$

$$0 \leq j \leq 2.$$

hold, $n_{min}$ being a possible minimum value for an integer. By this variable divided pulse technique, a wide range of linear velocity can be applicable to a single fixed medium.

Specifically, in accordance with the invention, when the linear velocity is reduced and it reduces the cooling rate during the resolidification process, the pulse width $\alpha_i T$ during which Pw is turned on is reduced while the time interval $\beta_i T$ during which Pw is turned off is increased. Alternatively, the laser power $Pb_i$ is reduced as the linear velocity is reduced, wherein the $Pb_i$ is a bias power level being applied during a time interval $\beta_i T$ during which the recording power Pw is turned off. Thus the cooling rate is increased by suppressing the accumulation of heat within a single mark to prevent the recrystallization. As a further alternative, in order to suppress the effect that an area which is formed by one of divided pulses, used to record a single mark, is heated again by a following divided pulse, the power of radiation which is used to irradiate the recording medium during an interval between successive divided pulses is controlled, thus controlling the cooling rate of an area which is melted in order to form an amorphous mark.

To formulate more generally, first, linear velocities $V_1$ and $V_2$ are defined which are in a range $(V_L, V_h)$ to be used with an optical recording medium of phase-change to make a record. Namely, V1 and V2 satisfy the relation ship:

$$V_L < V_1 < V_2 < V_h.$$

Parameters $\alpha_{iL}$, $\alpha_{i1}$, $\alpha_{i2}$, and $\alpha_{ih}$ represent the widths of individual pulses corresponding to the respective velocities $V_L$, $V_1$, $V_2$, and $V_h$. Thus, in the present invention, the pulse division is controlled so that the following relationship:

$$\alpha_{iL} \leq \alpha_{i1} \leq \alpha_{i2} \leq \alpha_{ih} \quad (1)$$

hold for any "i" which satisfies $1 \leq i \leq m$.

Alternatively, parameter $\theta_i$, which is defined as a ratio of the bias power $Pb_i$ during the interval $\beta_{iT}$ to the erasing power Pe (namely, $\theta i = Pb_i/Pe$) is controlled so that the following relationship:

$$\theta_{1L} \leq \theta_{i1} \leq \theta_{i2} \leq \theta_{ih} \quad (2)$$

holds. In either case, additional requirements are made such that the inequalities:

$$\alpha_{iL} < \alpha_{ih} \quad (3)$$

or $$\theta_{iL} < \theta_{ih} \quad (4)$$

holds for at least one of "i"s" at least at $V_L$.

As a matter or course, the magnitude of the recording power Pw and the erasing power Pe varies depending on the individual linear velocity. In particular, the power Pe is selected to be of a power level which is capable of erasing an amorphous mark when it is irradiated only once as a d.c. power. More specifically, the power level Pe selected must be such that when a mark recorded with a single frequency of either $f_{max}=1/(2n_{max}T)$ or $f_{min}=1/(2n_{min}T)$ with a duty factor of 50% is irradiated with the erasing power Pe as a d.c. power, the attenuation of a carrier level of the erased signal must be generally equal to 20 dB or greater, wherein $n_{min}$ and $n_{max}$ are possible minimum and maximum values, respectively, for the n.

Alternatively, the erasing power level Pe selected should be such that when a mark recorded with a single frequency of $f_{max}=1/(2n_{max}T)$ with a duty factor of 50% is overwritten with a single signal of $f_{min}=1/(2n_{min}T)$ with a duty factor of 50% (even though the recording pulse need not be divided, the modulation should take place between two levels of Pw and Pe), there is a difference generally equal to or greater than 20 dB between the carrier level of $f_{min}$ and the carrier level of the erased $f_{max}$.

It is to be noted that the power level Pw is selected so that a carrier to noise ratio (C/N ratio) of signals recorded at $f_{max}$ and $f_{min}$ is generally equal to 45 dB or greater. It is well recognized that the power levels Pw and Pe as well as the clock period T are modified in accordance with the linear velocity which is used during the recording operation. However, we are the first to propose changing the divided pulse technique in accordance with a linear velocity, and under a given rule. Parameters which describe such variable divided pulse technique may be varied continuously in accordance with the linear velocity, or may be varied stepwise for different ranges of uniform linear velocities. The latter case is useful when the present invention is applied for Zoned Constant Velocity (ZCAV) format.

Figure 4:
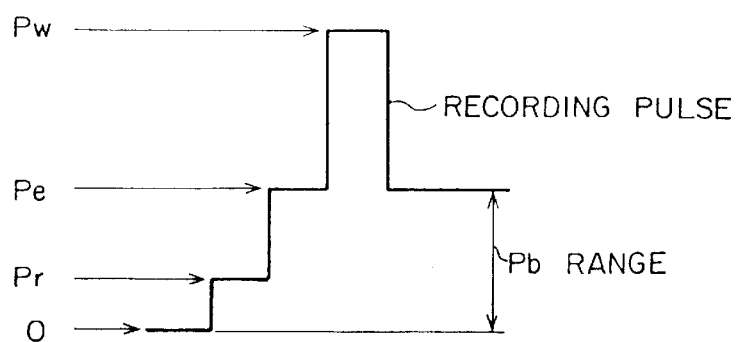
FIG. 4 is a graph showing principle of pulse division for laser irradiation power for recording a mark as used in the invention.

When a choice is made in the optical recording process such that the bias power level $Pb_i$ which is used during the time interval $\beta_i T$ when the recording power is turned off assumes an arbitrary value less than the power level Pe which is required for purpose of the erasure when the recording operation takes place between three levels (see FIG. 4) and that the magnitude of the power level $Pb_i$ is allowed to change among several values during the time interval $\beta_i T$, this enables a more fine control of the thermal distribution, thus allowing the amorphous mark formed to be shaped while improving jitters in a recorded signal. In addition, since the operation more close to a quenching operation, it is possible to reduce the size of a recrystallized region, thus improving the recording sensitivity.

However, it is to be noted that $Pb_i$ reaching 0 should be avoided, because no servo signal is available thus disabling a tracking servo. If the bias power $Pb_i$ exceeds the erasing power level Pe, the recording layer is usually caused to melt, thus disabling the erasure. Accordingly, it is required that the bias power level $Pb_i$ be greater than 0 and equal to or less than the erasing power level Pe. For a high linear velocity such as V equal to 10 m/s or more, the provision of a medium is desirable which enables an overwrite operation under a constant level of $Pb_i=Pe$ ($1 \leq i \leq m$), because at a high linear velocity, the clock period is shortened, requiring a rapid response in switching the $Pb_i$ level.

Figure 5A:
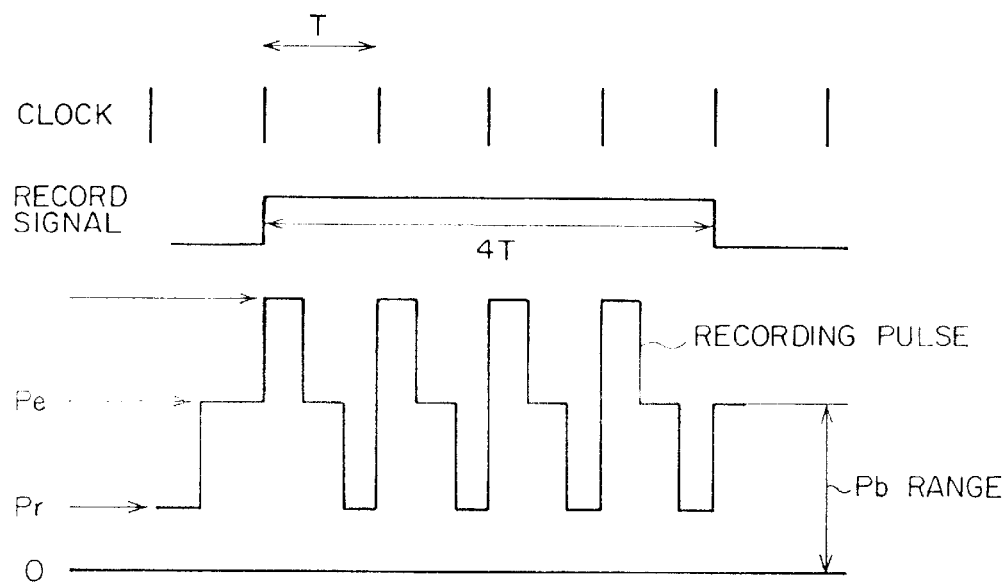
FIGS. 5A and 5B are examples of timing charts of mark-length modulated pulses for recording a 4 T mark in a method according to an embodiment of the invention.
Figure 5B:
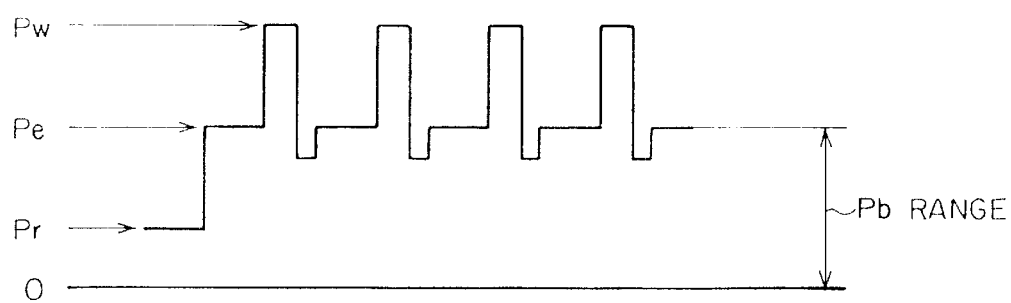

However, for use at a lower linear velocity, the clock period required is longer, thus alleviating the demand on the response of a pulse control circuit and accordingly, it is sometimes preferable to use a combination of several Pb levels, rather than a fixed level in order to shape the amorphous mark, even though the circuit arrangement is more complex. As an example of 4 T mark, FIG. 5A shows that during the $\beta_i T$ interval, the level $Pb_i$ is selected initially such that $0 < Pb_i < Pe$, followed by changing $Pb_i$ to $Pb_i = Pe$. In FIG. 5B, the choice of $Pb_i = Pe$ precedes, followed by a time interval in which $Pb_i < Pe$.

Where the power $Pb_i$ assumes a plurality of values $Pb_{ij}$ during the time interval $\beta_i T$ where $\beta_i = \Sigma_j \beta_{ij}$ and $Pb_{ij}$ represents a bias power level assumed during a segment $\beta_{ij} T$ which is divided from the time interval $\beta_i T$, $\theta_i$ mentioned above is replaced by $\theta_i$ as follows:

$$\theta_i = \Sigma_j (Pb_{ij} \beta_{ij} T)/(Pe \cdot \beta_i T).$$

so that the equations (2) and (4) mentioned above hold.

Figure 6A:
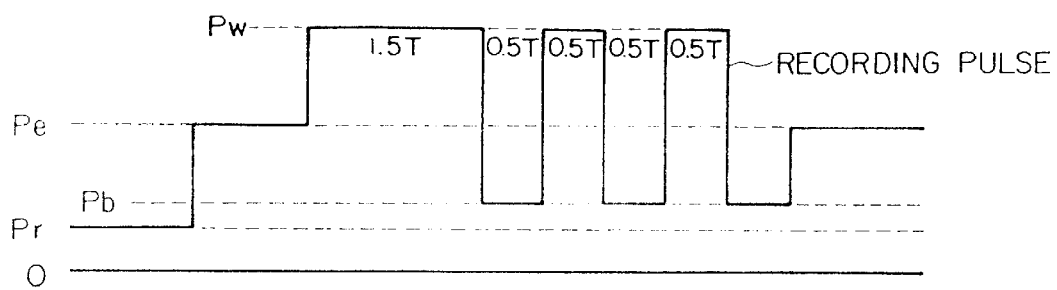
FIGS. 6A and 6B are other examples for the timing chart of mark-length modulated pulses for recording a 4 T mark in a method according to an embodiment of the invention, wherein Pb (<Pe) is applied during a part of the off-pulse period $\beta_i T$, the heading divided pulse period $\alpha_1 T = 1.5$ T being longer than the following divided pulse periods $\alpha_i T$ ($2 \leq i \leq m$) in FIG. 6A, an off-pulse period existing prior to the heading divided pulse period $\alpha_i T$ in FIG. 6A.

When the optical recording process as mentioned above is implemented, it will be noted that a front portion of a mark is usually less subject to a temperature rise, because an immediately preceding laser power assumes an erasing power level. This may be accommodated for by using a heading divided pulse having a pulse width which is greater than that of succeeding divided pulses (see FIG. 6A).

Figure 6B:
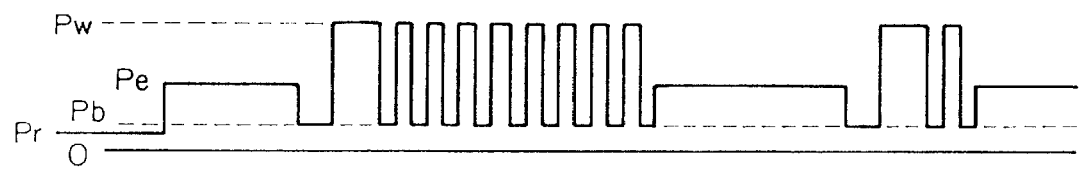

It is not always required that the rising edge of each divided pulse be synchronized with the rising edge of the intended nT recording signal. Such a synchronization is desirable from the standpoint of simplifying a pulse control circuit. However, if a synchronized arrangement is selected, it is still to be noted that offsetting only the rising edge of the heading pulse or the ending pulse of a single mark length (at most by T) is effective in correcting for a thermal interference between discrete marks. In addition, in order to suppress a thermal interference with a preceding mark, it is effective to provide an off-pulse interval immediately or with a distance of at most 2T before the heading divided pulse used with a succeeding mark (see FIG. 6B) even though this involves a complex circuit arrangement.

Figure 7:
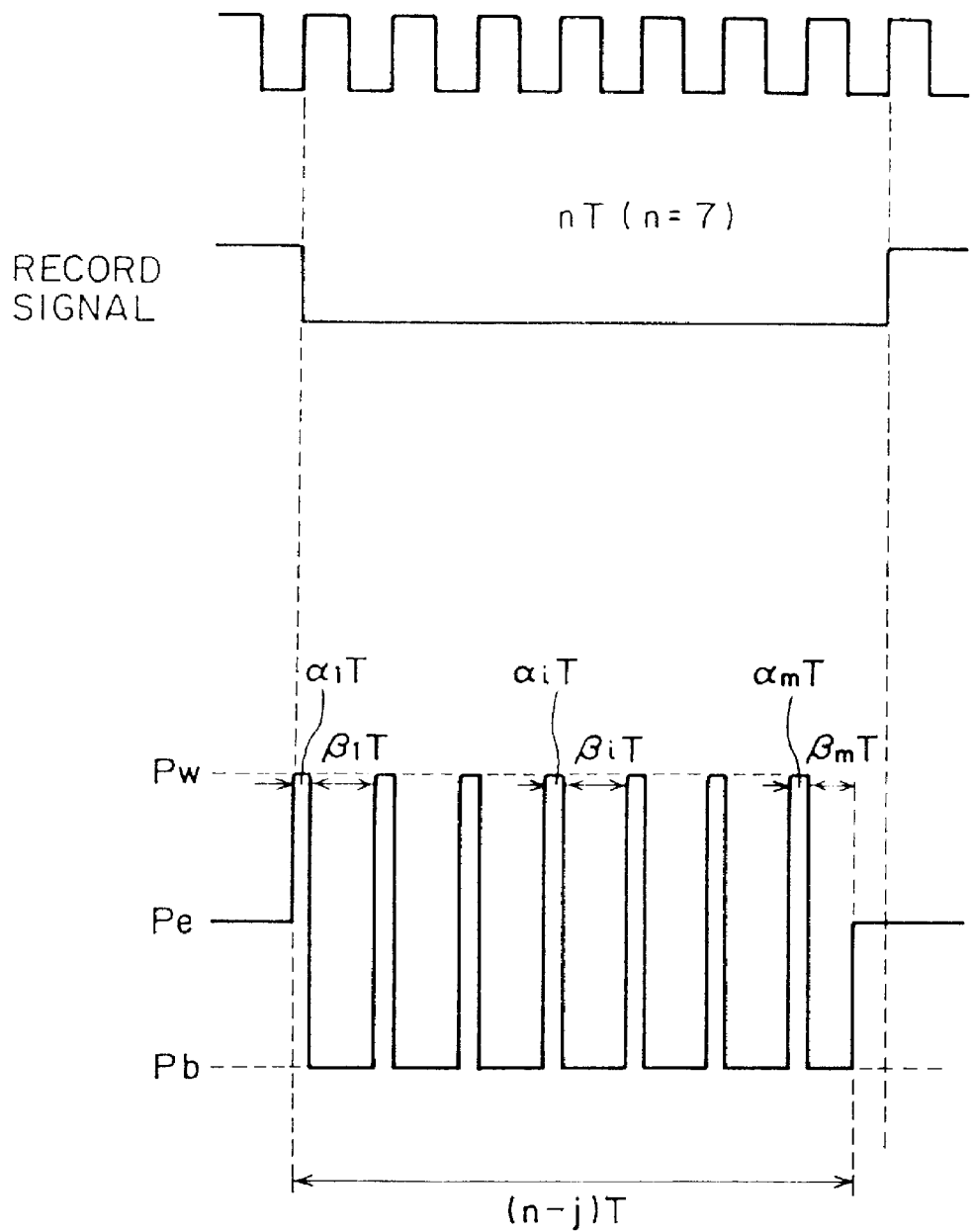
FIG. 7 is another example of a timing chart of mark-length modulated pulses for recording a 7 T mark in a method according to an embodiment of the invention wherein n−j<n.

It is desirable that the recording power level Pw be constant in a given linear velocity independently from any mark length nT and be also constant for every divided pulse within a single mark in order to simplify the pulse control circuit. However, providing a stepwise change between the recording power of the heading pulse and the succeeding pulse in a single mark, in particular, by selecting the recording power of the succeeding pulse to be lower, was found to be effective means under certain circumstances. Sometimes, it happens that a longer mark than is required is recorded when a pulse length nT is used to record nT mark length. Namely, the use of n which satisfies $$(\alpha_1 + \beta_1 + \ldots + \alpha_m + \beta_m) = n$$

may result in a prolonged heating interval. In such instance, a choice is made to use a real number j which is defined by:

$$(\alpha_1 + \beta_1 + \ldots + \alpha_m + \beta_m) = n - j (0 < j \leq 2),$$

and the number of divided pulses m=n−k may be changed accordingly. FIG. 7 shows an example in which $\beta_i$ ($1 \leq i \leq m-1$) remains constant while only $\beta_m$ is changed. In this instance, by adjusting $\beta_m$, the value (n−j) may be changed to form a desired mark length nT.

As mentioned before, there are at least three parameters used in changing the divided pulse technique in accordance with the linear velocity. However, in view of simplification of the pulse control circuit required, it is preferable that the number of divided pulses m=n–k, the pulse length (n–j) as well as ($\alpha_i+\beta_i$) be selected constant independently from the linear velocity while providing an arrangement so that the equations (1) to (4) hold at linear velocities $V_1$ and $V_2$ which satisfy the relationship $V_L<V_1<V_2<V_h$.

More preferably, a choice should be made such that at the maximum linear velocity $V_h$ used, $\alpha_{1h}$=0.5, 1.0, or 1.5 and $\beta_{1h}=\alpha_{ih}$=0.5 ($2\leq i\leq m$)

hold, and that $\alpha_i+\beta_i$=1.0 ($2\leq i\leq m$)

holds at any linear velocity. The rising edge of each individual pulse will then be synchronized with a reference clock except for a given delay, thus facilitating the design of the pulse control circuit. Finally, in the optical recording processes mentioned above, for a linear velocity which satisfies the relationship $V_L<V<V_h$, the pulse width may be reduced to prevent the recrystallization as the linear velocity is reduced. However, if the pulse width is reduced too much, the resulting recording sensitivity will be degraded, which is undesirable. As a consequence, there is a lower limit in actuality such that $0.05<\alpha_i$.

While the invention is directed to a mark length modulation recording, there is no limitation in a mark edge detecting scheme used. Thus, a simple slicing by a d.c. level or twice differentiation as disclosed in Jpn. J. Appl. Phys., Vol. 31 (1992) pp 584 to 589, may be used for purpose of peak detection. Also, a distinct mark edge detection at the leading and the trailing edges of the mark as disclosed in the same literature is effective.

Figure 8:
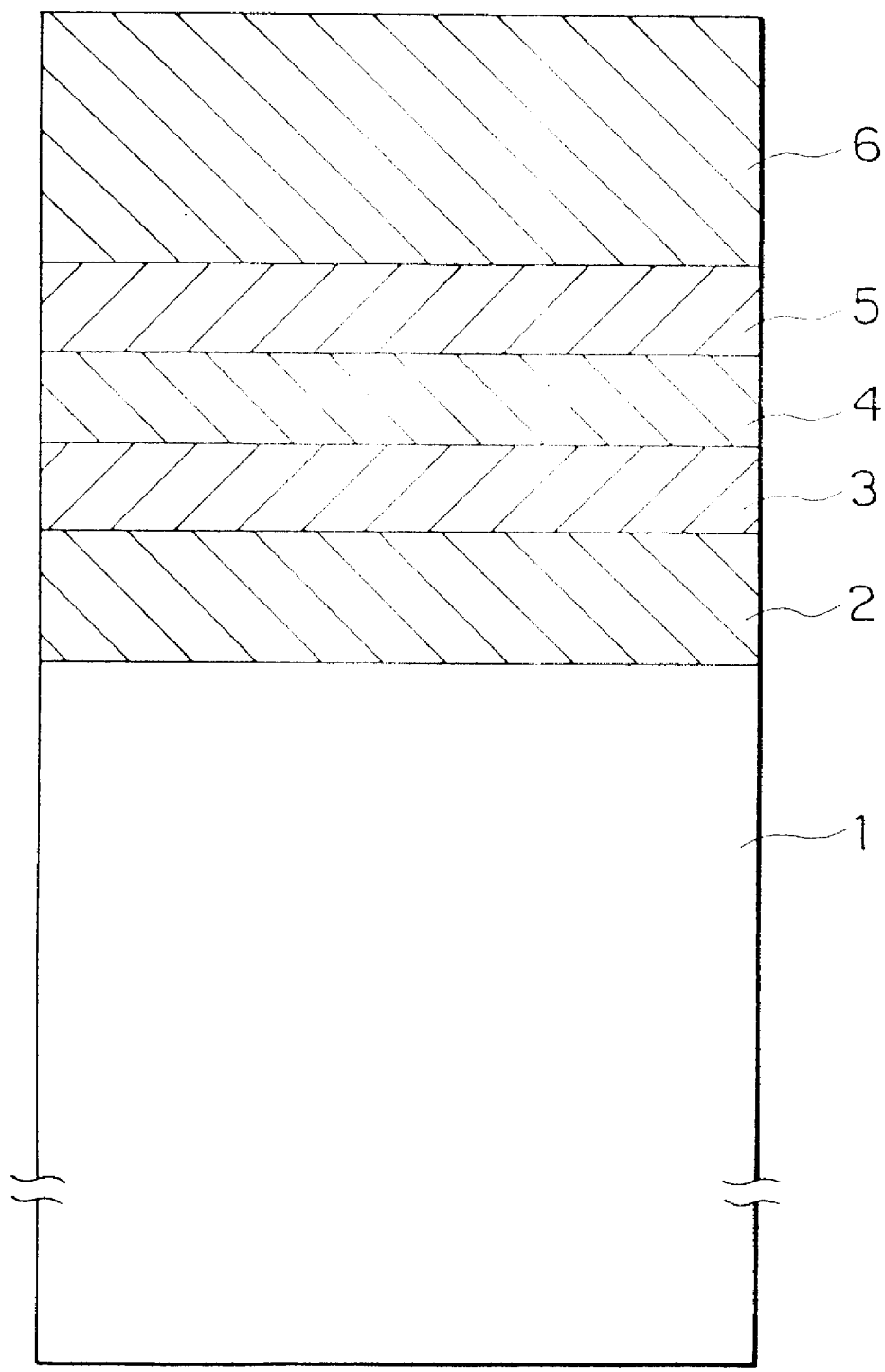
FIG. 8 is a multilayer structure of a recording medium according to an embodiment of the invention.

An optical recording medium to which the invention is applicable is of a so-called phase-change type, in which a crystallized state represents a non-recorded state and an amorphous mark is formed for a recorded state. An example of such medium is illustrated in FIG. 8, but it should be understood that the invention is not limited to such multilayer structure. Referring to FIG. 8, a substrate 1 is overlaid by a bottom protective layer 2, on top of which a recording layer 3 of phase-change type is formed. A top protective layer 4 protects the recording layer 3, and is in turn covered by a reflecting layer 5 which is formed of either metal or semiconductor. A topmost protective layer 6 is formed of a resin which is hardened by the application of ultraviolet or heat. Thin films 2 to 5 are normally formed by using a sputtering process.

In general, a focussed beam which is used for purpose of recording or retrieval is used to irradiate the recording layer 3 through the transparent substrate 1. The recording layer 3 is locally heated to melt upon irradiation with the recording power Pw. When the irradiation by the focussed beam is turned off, the recording layer is rapidly cooled to solidify, assuming an amorphous state. An amorphous mark is heated to a temperature below the melting point but above the crystallization temperature upon irradiation with the erasing power Pe, and thus is recrystallized, whereby the data is erased. Materials for a recording layer which can be overwritten according to such principle include GeSbTe alloy mentioned above (in particular, pseudo-binary alloy of GeTe and $Sb_2Te_3$), and $Sb_{70}Te_{30}$ having a composition approaching an eutectic composition and to which at least one of Ag, Cu, Au, Ge, Pd, Pt etc. is added. For these alloys, the crystallization speed, the capability to form an amorphousness or the crystallization temperature is preferably controlled through the control of the amount of Sb used, and the alloy is optimized in accordance with a linear velocity used. The medium should have enough erasability of over 20 dB at the maximum linear velocity $V_h$ to be used.

To give an example, as the amount in addition of excess Sb to the pseudo-binary alloy comprising GeTe—$Sb_2Te_3$ is increased, the capability of forming the amorphous is enhanced while the crystallization speed is reduced, and hence the resulting alloy is adapted for use with a low linear velocity. A control over an optimum linear velocity is also possible by controlling the thickness of the recording layer 3 and the protective layers 2 and 4 and also the thermal conductivities of the protective layers 2 and 4 and the reflecting layer 5, which in turn controls the undercooling rate of a molten region formed during the recording operation. For example, when the thermal conductivity of the protective layers is increased or a thickness is selected for each of the recording layer and the top protective layer on the order of 15–30 nm to promote a thermal diffusion from the recording layer to the reflecting layer, the formation of the amorphous is promoted, and hence the resulting medium is adapted for use with the low linear velocity.

A specific application of the invention lies in a recordable compact disc (CD-E) where $V_L$=1.2 to 1.4 m/s. It is desirable for the compact disc to enable recording and reproduction operations at a single, double, quadruple or sextuple speed of $V_L$. While the use of such CD-E is not divulged yet. It is recognized that a recordability over a wide range of linear velocities from single to sextuple speed is desirable for a recordable CD of write-once type (CD-R, standing for CD-Recordable) which is already available on the market.

In this instance, it is effective to employ EFM modulation in which m=n, n–1 or n–2 as a mark length modulation scheme, to allow velocity V to assume one of a finite number of values including $V_L$, $2V_L$, $4V_L$ and $6V_L$ and to change the recording pulse division technique such that: at a linear velocity V equal to or greater than $2V_L$, $\alpha_{1h}$=1.5 or 1.0 and $\beta_{1h}=\alpha_{ih}$=0.5 ($2\leq i\leq m$);

at any linear velocity, $\alpha_i+\beta_{i-1}$=1.0 ($2\leq i\leq m$);

at a linear velocity equal to $2V_L$, $Pb_i$=Pr±0.5 mW (constant, independently of i) ($1\leq i\leq m$, and Pr represents a reproducing power); at linear velocity equal to $V_L$, $0.05<\alpha_i<0.5$ ($2\leq i\leq m$) and $\alpha_{iL}\leq\alpha_{ih}$, and at linear velocity equal to $V_h=4V_L$ or $6V_L$, $Pb_i$=Pe±0.5 mW ($1\leq i\leq m$).

In any case, $\beta_m\neq 0.5$ can be used, which possibly means $\beta$ assuming zero. In other words, an off-pulse duration $\beta_m$T at the trailing edge of each nT mark may have a time interval different from those of off-pulse durations within the mark ($\beta_i$T, for $1\leq i<m$). In this manner, a single medium can accommodate for a variety of drives which perform a recording operation at different linear velocities.

In an example of eight-to-fourteen modulation, in which a maximum linear velocity $V_h$ ranges from 2 to 6 times a minimum linear velocity $V_L$ which satisfies $1.2\leq V_L\leq 1.4$ m/s in, the following divided pulse technique may be employed:

m=n, n–1 or n–2;

a linear velocity V assumes limited finite values of $V_L$, $2V_L$, $4V_L$ or $6V_L$;

at any linear velocity V, $\alpha_i+\beta_{i-1}=1.0$ holds for any i which satisfies $2 \leq i \leq m$;

at any linear velocity V, $Pb_i=Pr\pm0.5$ mW holds for any i which satisfies $1 \leq i \leq m$ wherein Pr represents a reproducing power level; and $\alpha_i$ is reduced monotonically for any i which satisfies $1 \leq i \leq m$, as the linear velocity is reduced. In the above case, $\beta_m$ should not be equal to zero.

In the above instance, it is preferable that the clock period T is selected at $T=T_h(V_h/V)$ for a linear velocity V, wherein $T_h$ represents a clock period selected for a possible maximum linear velocity $V_h$.

A more specific example of CD-E recording medium which is adapted for use with the optical recording process mentioned comprises a bottom dielectric protective layer, a recording layer comprising $[(GeTe)_y(Sb_2Te_3)_{1-y}]_{1-x}Sb_x$ wherein $0 \leq x < 0.1$ and $0.2 < y < 0.9$, a top dielectric protective layer and a metal reflecting layer disposed sequentially on top of the substrate. The recording layer has a film thickness of 15 to 30 nm and the top dielectric protective layer has a film thickness of 10–30 nm.

Another example comprises at least a bottom dielectric protective layer, a recording layer comprising $(M_yTe_{1-x}Sb_x)_{1-y}$ ($0 < y < 0.3$, $0.5 < x < 0.9$, the M being at least one of In, Ga, Zn, Ge, Sn, Si, Co, Cr, Cu, Ag, Au, Pd, Pt, S, Se and O), a top dielectric protective layer and a metallic reflecting layer sequentially disposed on top of the substrate, the recording layer having a film thickness of 15–30 nm and the top dielectric protective layer having a film thickness of 10–30 nm.

Japanese Laid-Open Patent Publications No. 212,735/1992 and No. 62,193/1993 are earlier applications with respect to the present application relating to a recording medium of phase-change type employing GeSbTe recording layer which is rewritable at a linear velocity of CD, and disclose a recording process in which a recording pulse for a long mark is divided. However, these earlier applications have no illustrations of the divided pulse technique at the double speed $2V_L$, for example, and includes no reference to the problem of dependency upon the linear velocity which occurs when recording at a double, quadruple or sextuple speed. Accordingly, no disclosure is contained in these earlier applications about changing a recording divided pulse technique under a given rule in order to overcome the dependency upon the linear velocity.

Japanese Laid-Open Patent Publication No. 37,251/1995, and a publication for "International Symposium on Optical Memory, 1995, Kanazawa, Japan, No. P-33" illustrate an example of CD-E medium using AgInSbTe recording layer and an associated recording process. However, again, there is no disclosure about the problem of dependency upon the linear velocity and any approach to cope with it.

Another effective utilization of the present invention resides in eliminating the dependency on the linear velocity which is caused by difference in linear velocity between the inner and the outer peripheries of a disc of phase-change type which rotates at a constant angular velocity (CAV). Specifically, for a medium having an increased radius in which the ratio of radii around the outer and the inner periphery of a recording region is equal to or greater than two, there will be a linear velocity ratio equal to or greater than two between the inner and the outer peripheries.

To change the composition of a recording layer or a multilayer structure between the inner and the outer peripheries in order to overcome the dependency upon the linear velocity requires a special sophistication during the manufacturing process, which is difficult to implement. However, when the variable divided pulse technique according to the invention is employed to change the manner of division in accordance with the linear velocities around the inner and the outer periphery, a medium which is uniform in the radial direction may be employed to record information over the entire disc surface for recording without causing any difficulty. The change of the recording pulse division in accordance with the radial position may be performed in an interlocked relationship with a switching of the reference clock period at a corresponding radial position for a medium of normal ZCAV (zoned CAV) type.

For a more convenient and effective use of the optical recording process according to the invention, a disc used may be initially entered with information which relates to the pulse division in terms of pit information, for example. Preferably, such description of pulse division information be made such that a portion of the parameters mentioned above (Pw, Pe, Pb, m, j, k, $\alpha_i$, $\beta_i$) which is to be made variable can be changed in accordance with the linear velocity used or changed in accordance with zone in ZCAV format. Such description may be made in a manner such that instead of describing a division technique for a linear velocity V which satisfies the relationship $V_L \leq V \leq V_h$, a detailed pulse method for $V_L$ and $V_h$ alone are given while a divided pulse method for an intermediate linear velocity V may be derived by an interpolation between $V_L$ and $V_h$. For example, $\alpha_i$ and $\theta_i$ can be reduced between $\alpha_{iL}$ and $\alpha_{ih}$ and between $\theta_{iL}$ and $\theta_{ih}$, respectively, in proportion to the linear velocity.

For a medium CD-E mentioned above, information relating to the divided pulse technique may be previously entered into a substrate by utilizing a frequency modulation of a wobbled groove, i.e., so called "ATIP Signal (Absolute Time in Pre-Groove)", which is disposed in a lead in area. In the operation, a disc drive reads information relating a divided pulse method that is previously described or recorded on a disc, and automatically performs a specified divided pulse technique and a recording at a corresponding linear velocity. Thus, a compatibility is achieved between a variety of media of phase-change type which exhibit different dependencies upon the linear velocity, but which utilizes a common format for information to be recorded. In this manner, a specific medium of phase-change type, even if data is recorded thereon using a disc drive which adopts a particular, specific divided pulse technique, does not suffer from the problem that a correct signal may not be properly recorded as a result of recrystallization.

By the variable divided pulse technique in dependence upon the linear velocity in accordance with the invention, it is possible to assure that an ideal temperature distribution is produced on the disc if a recording is made under different conditions of linear velocity, for example, in a range below $V_h \geq 2V_L$. In this manner, the possibility of recrystallization under a low linear velocity or a failure of erasure under a high linear velocity can be suppressed, thus enabling a single disc to be used over an extensive range of linear velocities which could not have been accommodated for by a conventional medium of phase-change type.

EXAMPLES

Examples of the preferred embodiments of the present invention will now be shown. However, it should be understood that the invention is not limited to the specific embodiments described below.

In the examples and comparative samples to be described below, a recording (one-beam overwrite) has been made using a disc drive tester manufactured by Pulsetech Co., having a 680 nm laser diode and NA=0.60 optical lens. A reading power Pr is 1.0 mW, and is fixed independently from the linear velocity. The clock period T is selected to be in inverse proportionality to the linear velocity, and is selected to T=143 nsec (7 MHz) for recording at 1.4 m/s and to T=20.0 nsec for 10 m/s.

EXAMPLE 1 AND COMPARATIVE SAMPLES 1 AND 2

A magnetron sputtering process is used to deposit 100 nm thick $(ZnS)_{80}(SiO_2)_{20}$ [mol %] layer, a 25 nm thick $Ge_{22.2}Sb_{22.2}Te_{55.6}$ [at. %] layer, 20 nm thick $(ZnS)_{80}(SiO_2)_{20}$ [mol %] layer and 100 nm thick Al alloy layer in a sequential order on top of a polycarbonate substrate. Additionally, 4 μm thick ultraviolet ray cured resin is provided to form a disc. An evaluation is initially made using repeated patterns each including a 3 T/9 T/7 T/9 T/11 T/9 T pattern where the underlined interval represents a mark, and no underlining corresponds to a space between marks. After overwriting several times, under conditions which enable an overwrite operation, a reproduced signal from the disc is sliced at the center of peak-to-peak of 11 T/9 T portion to detect a mark length. The detection utilized a timing interval analyzer (TIA, model E1725A manufactured by Heulett Packard Co.). (Refer to a "primary peak detecting method" such as described in Jpn. J. Appn. Phys., Vol. 31 (1992), pp 584 to 589.)

Figure 9A:
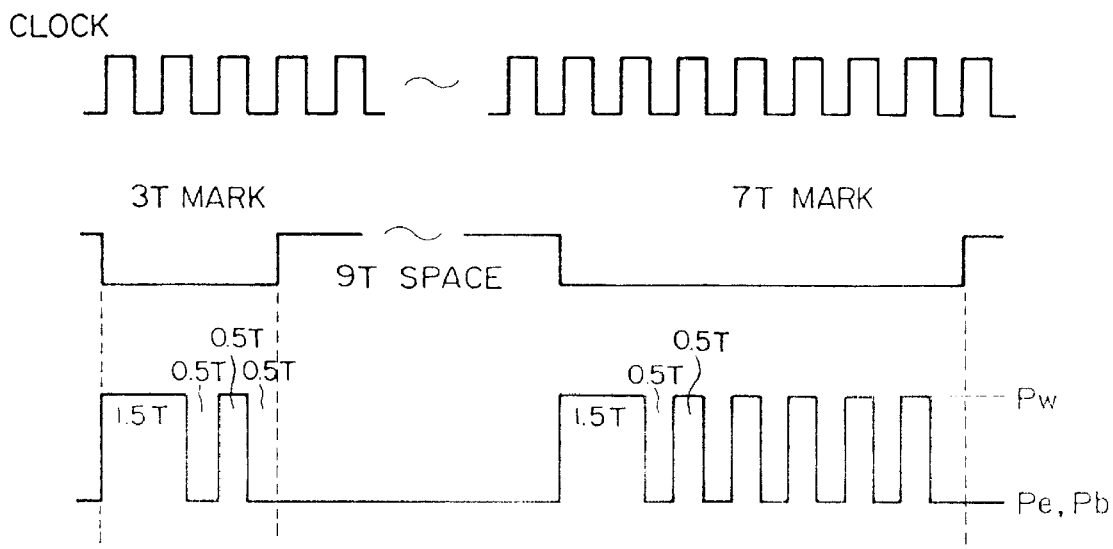
FIGS. 9A and 9B are other examples of timing charts of mark-length modulated pulses for recording repetitive sequence of 3 T, 7 T and 11 T marks including 9 T spaces as used in embodiments of the present invention.
Figure 10A:
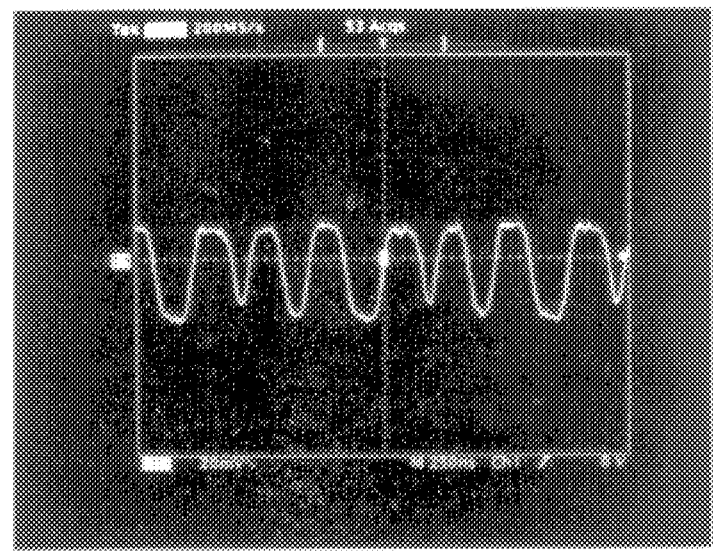

An overwrite operation was performed according to the Example 1 using a pulse pattern such as shown in FIG. 9A in the divided pulse technique in which m=n−1, j=0 (since Pe=Pb, the same applies if j=0.2), $\alpha_1=1.5$, $\beta_1=0.5$, $\alpha_i=\beta_i=0.5$ ($i \geq 2$), which is in itself known and disclosed in Proc. Int. Symp. on Optical Memory, 1991, pp 291–296, for example. It is found that a satisfactorily reproduced waveform is obtained, as shown in FIG. 10A, using Pw=12.0 mW and Pe=4.0 mW. Similarly, another overwrite operation was performed up to a range of 20 m/s while selecting suitable values Pw and Pe and adjusting the clock period in accordance with the linear velocity, satisfactorily recorded waveforms have been obtained in all instances.

Figure 10B:
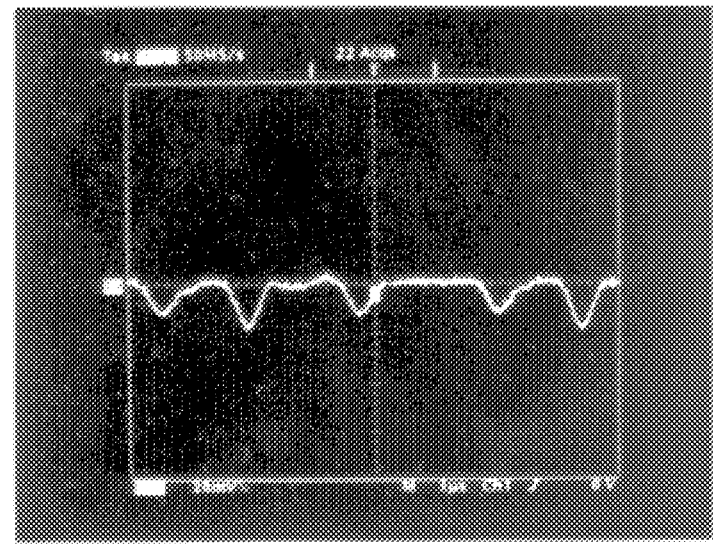
FIG. 10B is another oscillograph showing reproduced signal in Comparative Sample 1.

Mark lengths of 3 T, 7 T and 11 T with a satisfactorily low jitter in mark length less than 10% of T was obtained. In Comparative Sample 1, a similar pulse pattern is used while adjusting the clock period alone, and an overwrite operation was attempted at 1.4 m/s. However, any combination of Pw and Pe failed to make a record of 7 T and 11 T mark lengths. FIG. 10B shows an example of the resulting waveform, which is a relatively good specimen as compared with the remainder. As the mark length was increased, the front half of the mark was caused to be recrystallized under the influence of after heat from the recording of the rear half of the mark, resulting in a failure to record an amorphous mark. In Comparative Sample 2, the composition of the recording layer optimized for use at 1.4 m/s in Example 1 was replaced by a more Sb-rich composition of $Ge_{23}Sb_{28}Te_{49}$. While an amorphous mark was formed in a satisfactory manner, a suppressed recrystallization resulted in an insufficient erasure ratio of an amorphous mark at 10 m/s, and hence the specimen is not suitable for use with an overwrite operation.

An optimization of a divided pulse technique in accordance with the invention is attempted by selecting a most difficult case in which a recording medium designed for use at a high linear velocity of 10–20 m/s is used to make an excellent recording at 1.4 m/s, as will further detailed below.

EXAMPLE 2

Figure 9B:
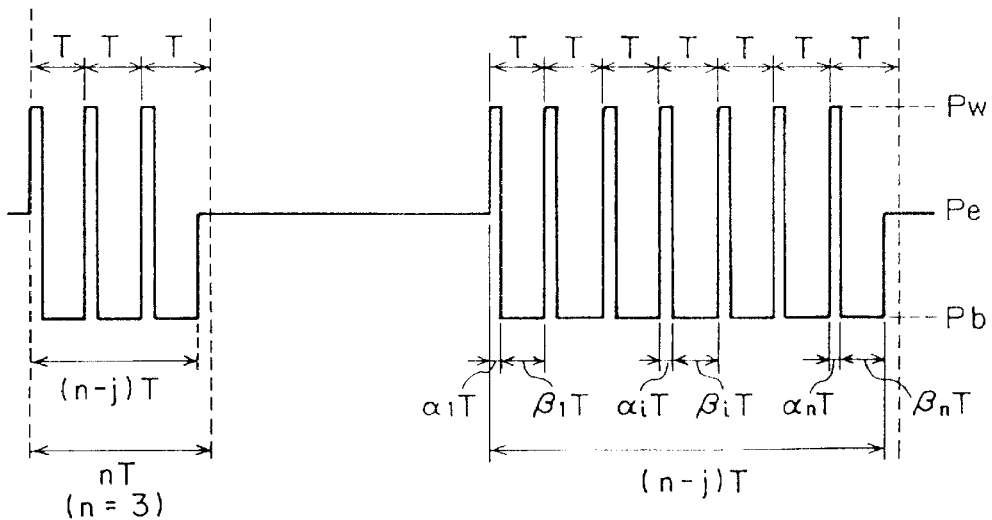
Figure 11A:
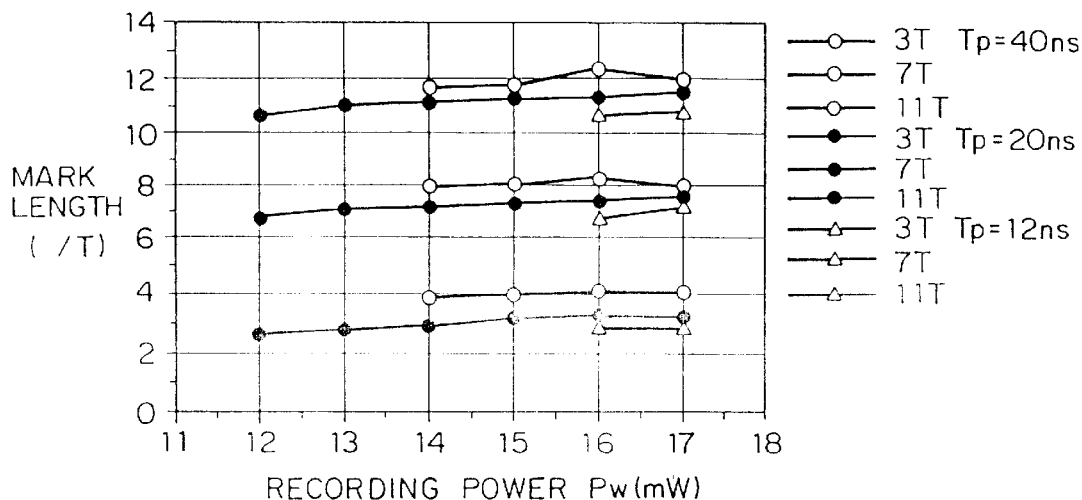
FIGS. 11A and 11B show dependency of mark length and jitter, respectively, on a recording laser power in Example 2 of the invention.
Figure 11B:
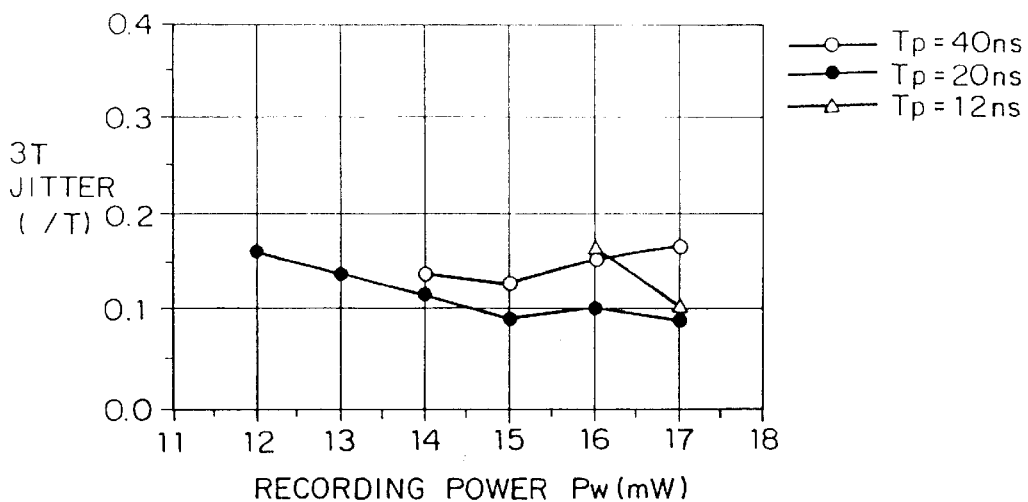

Using the disc which was optimized for a linear velocity of 10–20 m/s in Example 1, an overwrite operation of the repeated patterns of mark lengths as mentioned before was used at a linear velocity of 1.4 m/s. Parameters were selected such that m=n, j=0.2, Pe=4 mW, Pb=Pb$_i$=0.2 mW. The width of n divided pulses for an nT pulse, namely, Tp=$\alpha_i$T is fixed while Pw is varied (see FIG. 9B). At Tp$\geq$50 nsec, the amorphization substantially failed, and even the detection of mark edges with TIA is disabled. FIGS. 11A and 11B illustrate the dependency of the mark length for each nT mark (3 T, 7 T and 11 T) and jitter of the mark length (3 T), respectively, upon Pw when a shorter Tp is employed. When Tp was below 30 nsec (or less than 0.21 T), a proper mark length corresponding to a recorded mark nT with a satisfactory jitter, which is less than 0.1 T, was obtained at Pw=14 to 17 mW. However, at Tp=12 nsec (or 0.084 T) a recording power Pw greater than 16 mW was required and an insufficient sensitivity was indicated by the tester used. In this Example, all $\beta_i$'s were selected to be equal to one another except for $\beta_m$ which was adjusted at j=0.2.

EXAMPLE 3

Figure 12A:
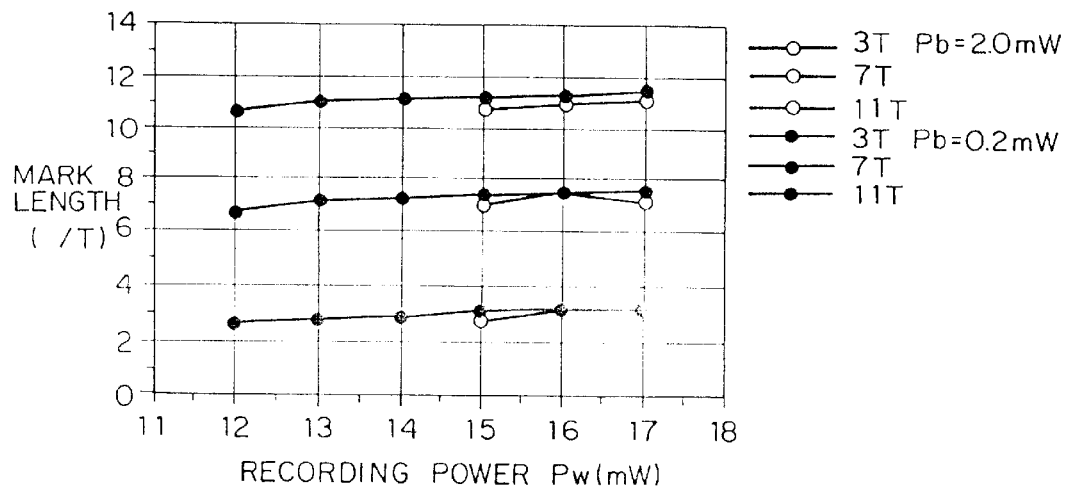
FIGS. 12A and 12B show dependency of mark length and jitter, respectively, on a recording laser power in Example 3 of the invention.
Figure 12B:
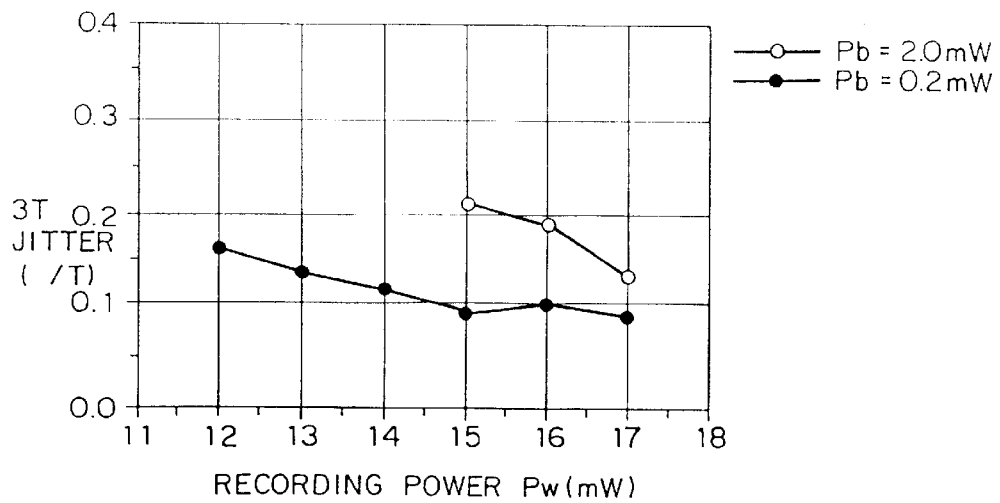

Under the conditions that Tp=20 nsec ($\alpha_i$=0.14), m=n, j=0.2 and Pe=4 mW, the powers Pb and Pw were varied. FIGS. 12A and 12B illustrate the dependency of the mark length and jitter, respectively, upon Pw and Pb, similarly to FIGS. 11A and 11B. When Pb was below around 1 mW, a satisfactory jitter, which is substantially less than 0.1 T, was obtained at Pw=14 to 17 mW. A choice of 0<Pb<Pr is found to have no influence upon tracking servo. A departure from the tracking servo did not occur when a Pb was selected to be equal to 0.2 mW and thus was below Pr for the time interval used.

It will be seen from Examples 2 and 3 that when a use over an extended range from 1.4 m/s to 20 m/s is intended, it is especially necessary that $\alpha_i$ be reduced in combination with a reduced value of Pb (or θ=Pb/Pe) at lower linear velocities.

EXAMPLE 4

Figure 13A:
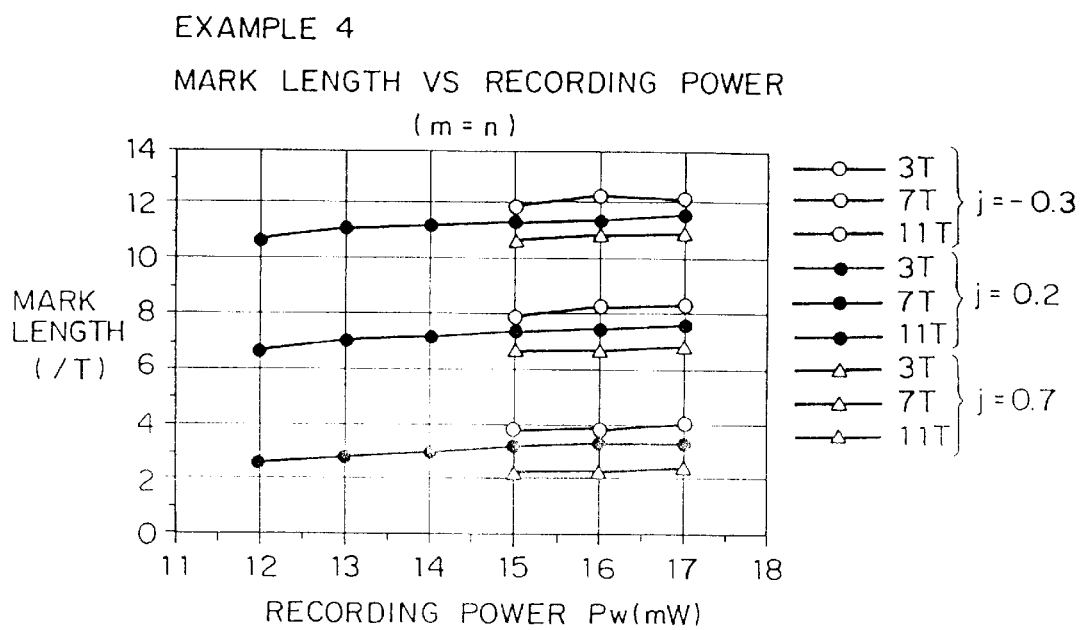
FIGS. 13A and 13B show dependency of mark length and jitter, respectively, on recording laser power in Example 4 of the invention.
Figure 13B:
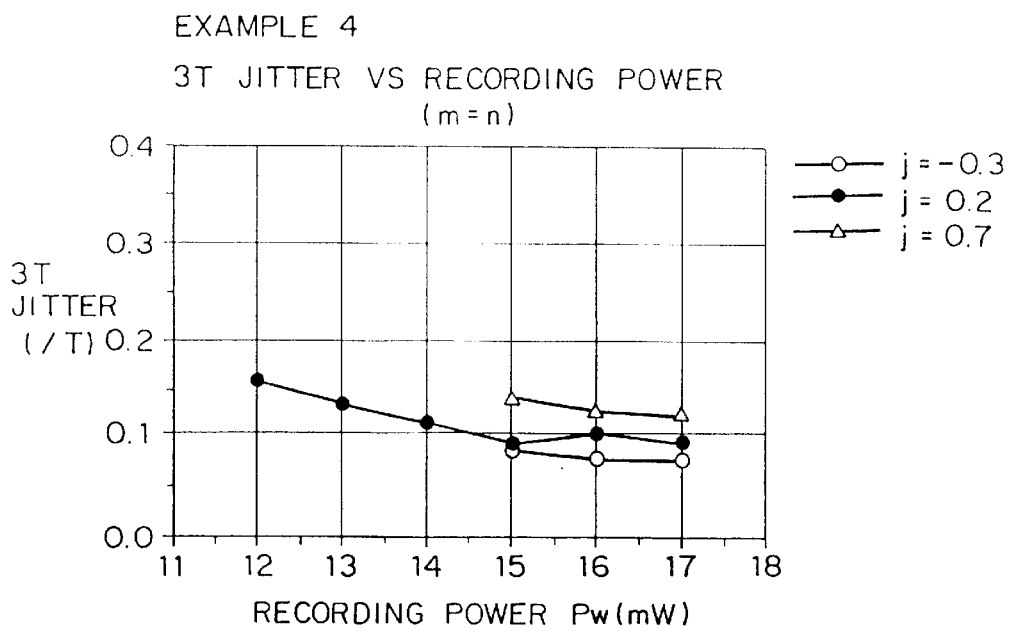
Figure 14A:
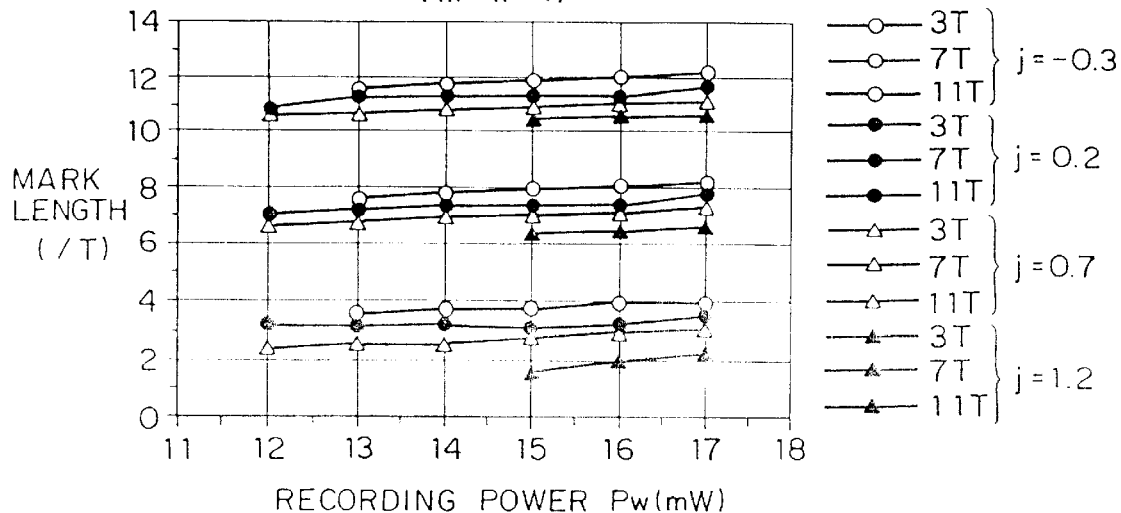
FIGS. 14A and 14B show another dependency of mark length and jitter, respectively, on recording laser power in Example 4 of the invention.
Figure 14B:
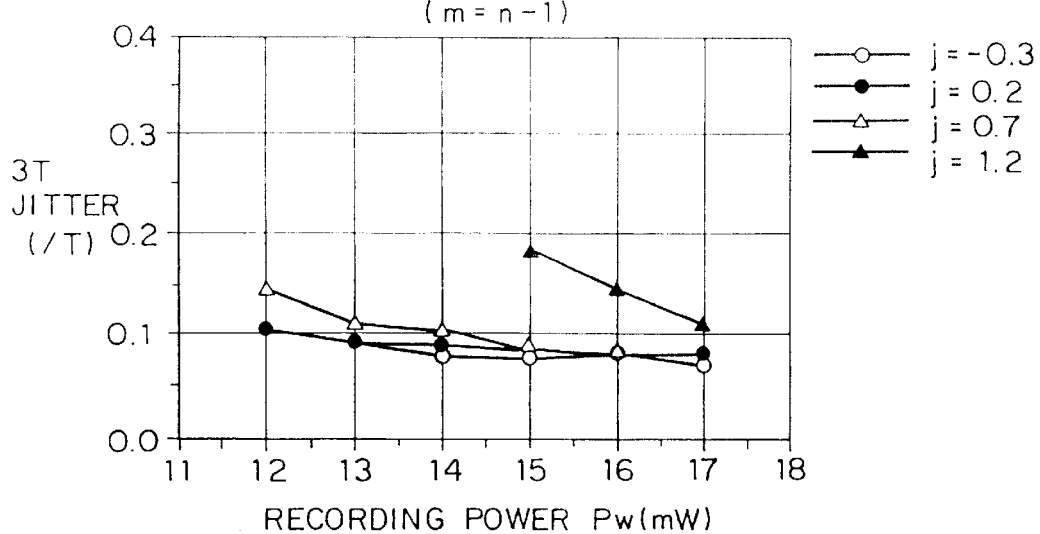

Under the conditions that Tp=20 nsec ($\alpha_i$=0.14), Pb=0.2 mW and Pe=4 mW, dependency of the mark length and jitter upon Pw and "j" is illustrated, similarly to FIGS. 11A and 11B, in FIGS. 13A and 13B for m=n, and in FIGS. 14A and 14B for m=n−1. It is noted that the mark length was strongly dependent upon n−j=Σ($\alpha_i+\beta_i$). It is seen that an optimum point lies in a range of j from 0.2 to 0.7 in any choice of m which is equal to n or (n−1). When the choice m=n−1 is made, it is only necessary for a range from 1.4 m/s to 20 m/s that only (n−j) and $\alpha_i$ be varied in accordance with the linear velocity while maintaining m constant, this is more preferable from the standpoint of a pulse control circuit than changing m in accordance with the linear velocity.

It will be noted that repeated patterns including mark lengths of n=3, 7 and 11 were employed. This means that an overwrite operation over an extended range of linear velocities is enabled for a pattern including every mark length corresponding to n from 3 to 11 as in an EFM modulation scheme which is used in a compact disc (CD). A shortest mark length of 3 T at T=143 nsec corresponds to 0.6 μm, which represents a higher density than that used in a currently available CD. However, if the shortest mark length is allowed to be extended to 0.8 to 0.9 μm as in the currently available CD, a certain optimization as to the pulse width or the like will allow an overwrite operation over the extended range of linear velocity in a similar manner. The same holds if the shortest mark length is further reduced, as in a mark length modulation recording as employed in a so-called digital video disc. Rather, the problem of dependency upon the linear velocity will be alleviated for reduced mark lengths because the recrystallization is less likely to occur. Even in such a high storage density region, the present variable divided pulse technique is useful.

EXAMPLE 5

As an example of overwriting the repeated pattern mentioned above on the medium of phase-change type at a linear velocity intermediate between 10 m/s and 1.4 m/s, a trial record was made at 2.8 m/s. It was found that under a divided pulse pattern including Tp=15–20 nsec, j=0.2, m=n, Pe=4 mW and Pb=0.2 mW, a suitable mark length with a satisfactory jitter less than 0.1 T was obtained at Pw equal to or greater than about 15 mW. Accordingly, for the medium of the present Example, a similar pattern is applicable at least for the single to double speed of the CD linear velocity. On the other hand, at 5.6 m/s which represented on the order of quadruple speed of the CD linear velocity, under the selected condition in that m=n−1, j=0.0, Pb=Pe, and Tp=20 nsec, a favorable jitter response, which is less than 0.1 T, was obtained at Pw=16 mW and Pe=4 mW.

EXAMPLE 6

Figure 15A:
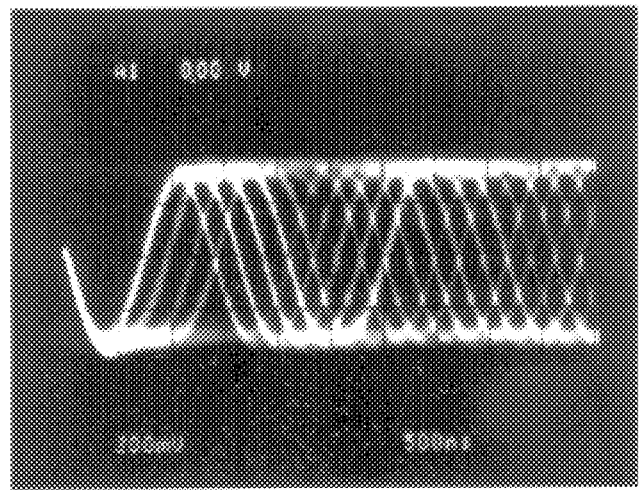
FIGS. 15A, 15B and 15C show oscillographs each showing reproduced signal in Example 6 of of the invention.
Figure 15B:
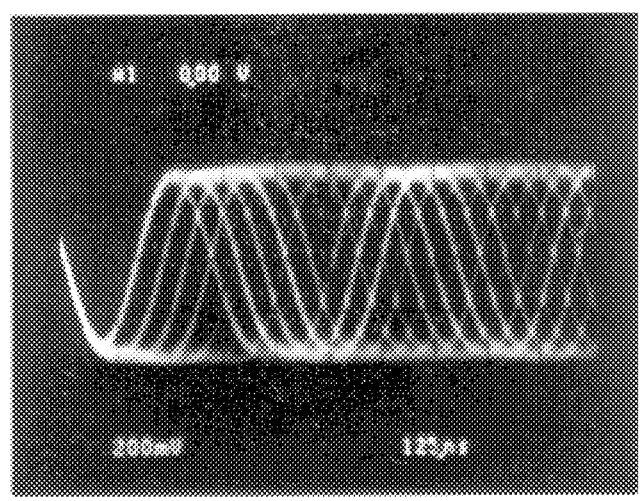
Figure 15C:
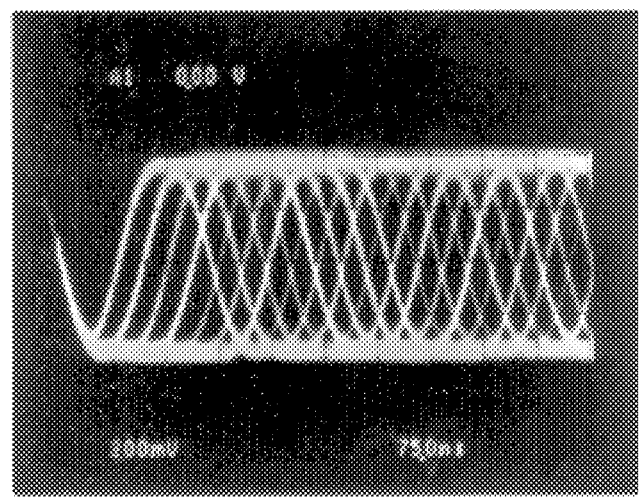

The invention is applicable when different pulse length modulation schemes are employed at higher and lower linear velocities. To demonstrate this fact, an overwrite operation was attempted using (1, 7) run-length-limited (RLL) code (comprising mark lengths from n=2 to 8) (which code is generally employed in a peripheral unit of a computer and an optical recording medium) at a linear velocity from 10 to 20 m/s while using EFM modulation at 1.4 m/s. The use of a fixed clock period T will facilitate a mark edge detector circuit even though a strict coincidence is not required. Since a physical shortest mark length represents a lower limit of the linear velocity which is determined by the physical properties of a particular medium, it should preferably be maintained constant. At this end, it is effective, for example, that the shortest mark 2 T in the (1, 7) modulation and the 3 T mark in the EFM modulation mentioned above be maintained equal to 0.6 $\mu$m by changing the clock period. FIGS. 15A, 15B and 15C illustrate eye patterns at linear velocities of 1.4 m/s (EFM modulation), of 5.6 m/s (EFM modulation) and of 10 m/s (1–7 modulation), respectively. Excellent waveforms were obtained at respective linear velocities, and the jitter in mark length was less than 0.1 T even at the shortest mark.

EXAMPLE 7

Figure 16:
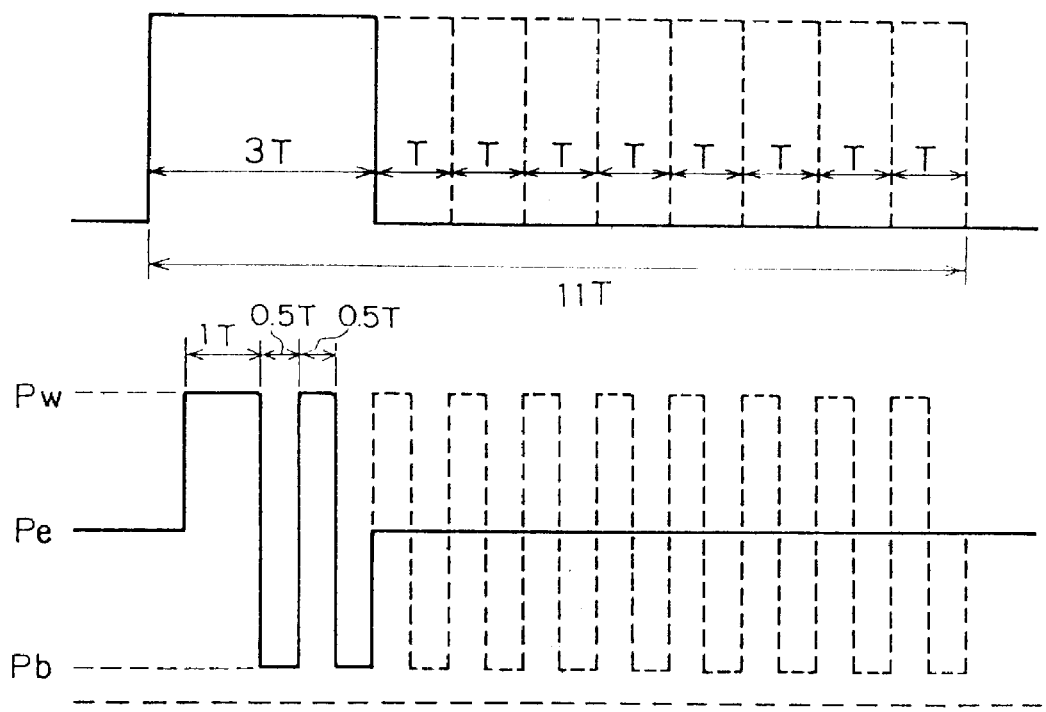
FIG. 16 is a timing chart of divided pulses for recording a mark in Example 7 of the invention.

A recording medium was prepared which had a multilayer structure similar to that of Example 1 except for a recording layer, which included an alloy thin film having the composition of $Ag_{4.2}In_{5.2}Sb_{62.6}Te_{28.0}$. A semiconductor laser diode having a wavelength of 780 nm and NA=0.55 was used in the recording for the recording medium. A recording was made at a linear velocity of 4.8 m/s, which is double the CD speed, using EFM modulation scheme, a pulse division technique (see FIG. 16) and with Pw=12 mW, Pe=6 mW and Pb=Pr=0.8 mW, to provide a good eye pattern. The jitter of each mark remained below 10% of the clock period T. When a recording was made on the same medium with a similar divided pulse technique except for doubling the clock period at a single speed of CD linear velocity, a considerable recrystallization was noted, failing to obtain a good eye pattern. However, when the parameters were selected such that $\alpha_i$ was equal to 0.33 (2≦i≦m) while maintaining $\alpha_i$ at 1.0 unchanged, wherein Pw=11 mW, Pe=5 mW and Pb=Pr=0.8 mW, to obtain an excellent eye pattern.

Now, the optical recording medium of phase-change type according to the invention, for use with the recording process of the invention as described above, will be detailed. The medium essentially comprises a substrate, a recording layer and a protective layer. The substrate is formed of a transparent material such as polycarbonate, acrylic resin or glass.

A known material for an optical recording layer of phase change type may be used as the recording layer in the invention. By way of example, compounds such as GeSbTe, InSbTe, AgSbTe, or AgInSbTe may be used which is known as a material enabling an overwrite operation. In particular, a thin film which is substantially composed of a $[(Sb_2Te_3)_{1-x}(GeTe)_x]_{1-y}Sb_y$ alloy, wherein 0.2<x<0.9 and 0≦y<0.1, or a $M_w(Sb_2Te_{1-z})_{1-w}$ alloy, wherein 0≦w<0.3, 0.5<z<0.9 and M represents at least one element selected from a group consisting of In, Ga, Zn, Ge, Sn, Si, Cu, Au, Ag, Pd, Pt, Pb, Cr, Co, O, S and Se, exhibits a stable state in either crystallized or amorphous form, enabling a rapid phase-change between both the states.

In addition, these alloys have an additional advantage in that they are less susceptible to segregation after overwrite operations are repeated, and thus are most practical materials. The recording layer is generally obtained by sputtering an alloy target in an inert gas, in particular, in Ar gas. A sputtered film generally contains Ar gas used during the sputtering process which is incorporated into the film. During repetitive overwriting, the gas sometimes precipitates and coalesces, forming a void on the order of 0.1 $\mu$m. It is therefore desirable that Ar contained in the recording layer be maintained below 1.5 at. %. By employing a relatively higher pressure for the Ar gas during the sputtering process, the amount of recoil Ar, which is reflected at target surface, can be reduced, thus reducing the amount of Ar contained in the film. However, the use of a higher Ar gas pressure reduces both the energies of Ar which is impacted upon the film and atoms flying from the target, preventing a dense film from being formed, thus posing a trade-off.

A recording layer having a lower density is degraded during repetitive overwriting, producing sink. To prevent the occurrence of such sink, it is desirable that the density of the recording layer be maintained equal to or above 86% of a theoretical bulk density. A theoretical bulk density is determined by the atomic weight and the ratio of numbers of atoms of the constituent elements in recording layer, as is the case of a protective layer, as mentioned above. Specifically, it is desirable that Ar content be equal to or greater than 0.1 at. % and less than 1.5 at. % and the film density be equal to or greater than 86% of the theoretical density.

A recording layer used in the medium of the invention is of a phase-change type, and preferably has a thickness which ranges from 10 nm to 100 nm. A low thickness of the recording layer which is less than 10 nm tends to deteriorates a satisfactory optical contrast and a recrystallization speed, presenting a difficulty in erasing amorphous marks within an acceptable length of time. On the other hand, if 100 nm is exceeded in the thickness, it becomes difficult to achieve an optical contrast and is likely to cause cracks, both of which are undesirable.

A protective layer is provided on at least the side of the recording layer which is opposite from the substrate, but is preferably provided on the opposite sides of the recording layer so as to sandwich the recording layer therebetween. Obviously, a dielectric layer having another composition may be disposed between the substrate and the recording layer or at another location. A protective layer is composed of a mixture including: at least one material selected from a group consisting of (1a) sulfide or selenide of an element of IIa-group, (1b) sulfide or selenide of a rare earth metal, or (1c) at least one of compounds $TaS_2$, $TaSe_2$, $ZrS_2$ and $WS_2$; and at least one compound selected from a group (2) of refractory compounds other than sulfide or selenide which has a melting temperature or decomposition temperature equal to or greater than 1,000° C.

Examples of sulfides or selenides of IIa-group element mentioned under the paragraph (1a) includes MgS, CaS, SrS, MgSe or the like. Examples of sulfides and selenides of a rare earth metal mentioned under the paragraph (1b) include $SC_2S_3$, $Y_2S_3$, $La_2S_3$, $Ce_2S_3$, $Pr_2S_3$, $Nd_2S_3$, $Pm_2S_3$, $Sm_2S_3$, $Eu_2S_3$, $Gd_2S_3$, $Tb_2S_3$, $Dy_2S_3$, $Ho_2S_3$, $Er_2S_3$, $Tm_2S_3$, $Yb_2S_3$, $Lu_2S_3$ or at least one of a group consisting of these compounds in which S is entirely or partly replaced by Se. Among others, $La_2S_3$, $Ce_2S_3$, $Pr_2S_3$, $Nd_2S_3$, $Sm_2S_3$, $Eu_2S_3$, $Gd_2S_3$, $Tb_2S_3$, $Dy_2S_3$ are preferred. In particular, $La_2S_3$ and $Ce_2S_3$ are most preferred in reducing the cost because it is by an order of magnitude inexpensive as compared with other sulfides and selenides. As mentioned, the compounds listed under the paragraph (1c) include $TaS_2$, $TaSe_2$, $ZrS_2$ and $WS_2$. In particular, $TaS_2$ and $TaSe_2$ which exhibit an excellent thermal stability are most preferred in the paragraph. The use of zirconium disulfide and tungsten disulfide is desirable in improving a recording sensitivity of a medium of an overwrite type.

Sulfides or selenides in group (1), which generically include the compounds under paragraphs (1a), (1b) and (1c), contain a chalcogen, and hence exhibit a high adherence capability with a chalcogen or its peripheral element which is principally contained in a recording layer of phase-change type. In addition, formation of a multilayered structure is facilitated by the interposition of S or Se, which exhibits a high level of hardness to compression imposed from above, while responding to a shear stress in a two dimensional plane to produce a slip between layers in a relatively easy manner, thus effectively absorbing the grinding stress. It is believed that the occurrence of minute cracks can be suppressed while minimizing a microscopic plastic deformation by containing a material which exhibits such properties in mixture. A compound in the group (1) should preferably has a decomposition temperature or melting temperature equal to or greater than approximately 1,000° C. Other sulfides or selenides such as $MoS_2$ and $NbS_2$, which have low decomposition temperatures below 500° C., are not suited for the material for the protective layer of the present invention.

Substantially any ceramic, exclusive of a sulfide or selenide, which exhibits a heat resistance at or above 1,000° C. is suitable as a refractory compound of the group (2). A heat resistance at or above 1,000° C. means that the melting temperature is equal to or higher than 1,000° C., and means the absence of substantially any decomposition when heated to 1,000° C. Obviously, it is also required that it be optically transparent to laser radiation. At this end, it is desirable that it exhibits an imaginary part of a complex refractive index which is not greater than 0.05 in a region of wavelengths equal to or greater than 600 nm, when its thickness is on the order of 50 nm. If the material itself is not perfectly transparent, it is possible to achieve a transparency which presents substantially no problem whatever for practical purposes by forming a mixture film so long as the amount of addition is limited to a small quantity.

Refractory compounds of group (2) specifically include: oxides of Al, Si, Ge, Y, Zr, Ba, Ta, Nb, V, W, Hf, Sr, Zn or lanthanoids; nitrides of Al, Si, Ge, Ta and B; fluorides of Mg, Ca, Nd, Tb, La and Nd; and carbides of Si and B. Where a fluoride is employed, it is preferred to use an oxide in combination therewith because a tendency toward improving the brittleness is recognized in this case. From the standpoints of a cost required, and the ease of manufacturing a target, compounds such as silicon dioxide, yttrium oxide, barium oxide, tantalum oxide, $LaF_3$, $NdF_3$, $TbF_3$, SiC, $Si_3N_4$, and AlN are preferred.

The content of a compound under paragraph (1a) or (1b) should preferably be between 10 mol % and 95 mol % of the entire protective layer. At a content less than 10 mol %, a desired characteristic cannot be achieved, while over 95 mol %, an optical absorption coefficient will be too high, which is undesirable. More preferably, the content ranges from 15 to 90 mol %. The content of a refractory compound of group (2) which is to be admixed with a compound under paragraph (1a) or (1b) should preferably range from 5 to 90 mol %, and more preferably, not less than 10 mol %. The achievement of a desired characteristic may be prevented outside the range. Finally, the content of a compound under paragraph (1c) should preferably be in a range from 10 to 80 mol % of the entire protective layer. Under 10 mol %, a desired characteristic cannot be achieved while over 90 mol %, an optical absorption coefficient will be too high, which is undesirable. More preferably, the content is not greater than 60 mol %. In this instance, it is preferred that the content of the refractory compound of group (2) be greater than the content of the compound under paragraph (1c).

In a composite protective layer containing compounds selected from the groups (1) and (2), a total combined content of the compounds of the groups (1) and (2) should preferably be equal to or greater than 50 mol %, and more preferably, equal to or greater than 80 mol %. When the content is below 50 mol %, a tendency is recognized that the effect of preventing a deformation of a substrate or a recording film is insufficient, and the protective layer may not serve its purpose.

For the composite protective layer as mentioned above, it is preferred to provide a composite sputtering target comprising a mixture of a plurality of compounds which are used to form a film in order to achieve an even composition.

It is preferred that the film density of the protective layer according to the invention be equal to or greater than 80% of a theoretical density, which is an accumulated value of a density of each constituent compound in its bulk condition multiplied by a molar content of the constituent compound, as indicated by a formula below:

Theoretical density=$\Sigma$[(density of each constituent compound in bulk form)×(molar content of constituent compound)], where a film density can be easily determined from a volume which is in turn determined by the area of the substrate and a film thickness determined by a stylus meter, and a change in the weight of the substrate when the film is formed.

By achieving a high density for the protective layer, both the durability against repetitive overwriting and aging effect can be significantly improved.

It is possible in the practice of the invention that a metal or semiconductor element which is used in the sulfide or selenide selected from the group (1) is identical with a metal or semiconductor element (M) which is used in a refractory compound, in particular, in an oxide form, selected from the group (2). This is true when $TaS_2$ is selected from the group (1) and $Ta_2O_5$ is selected from the group (2). These materials may be used in a sputtering of a mixed target as mentioned.

Or otherwise, either sulfide or selenide of the M and the M itself may be reactively co-sputtered in a mixture gas of an oxygen and an inert gas (Reactive-ion co-sputtering).

As a further alternative, either a sulfide or selenide of the M and the M itself may be used to form a mixed target, which is then subjected to a reactive sputtering process. In this instance, the resulting target may be considered as a mixture of compounds selected from the groups (1) and (2), but it may also be considered as a substitution of the oxygen in the oxide selected from the group (2) by S or Se, which is a homologous element as the oxygen. It is found that the last process is more effective in improving the mechanical strength of a film than the use of heterogeneous compounds which are forcibly dispersed.

It is also noted that a sulfide or selenide is frequently a semiconductor, which may be used as alone or in a mixture with the M to enhance the conductivity, which enables a d.c. sputtering. From the standpoint of ease of manufacturing, a d.c. sputtering process is easily controlled and produces a high sputtering rate advantageously. Examples of the M, which can serve for the purpose mentioned above, include Ta, Zr, a rare earth metal, Mg, Ca and Sr.

To increase the film density, it is useful to utilize a lower gas pressure during a sputtering process, and usually a vacuum level of 1 Pa or less, more preferably, between 0.3 and 0.8 Pa is used. It is desirable that the intrinsic stress of the protective layer be held below $5.0 \times 10^9$ dyn/cm$^2$ in order to prevent a delamination or a warp of the substrate.

It is desirable that the protective film of the invention exhibits a complex refractive index which has a value of 0.05 or less for its imaginary part at the wavelength used for an optical recording and reading in order to enhance the absorption efficiency of the energy on the recording into the recording layer. To provide such optical transparency, it is preferred to use a mixture gas of Ar with oxygen and/or nitrogen during the sputtering process to form the film. In particular, S or Se contained in the sulfide and selenide exhibits a high vapor pressure, and hence tends to be partly decomposed or evaporated during the sputtering process. If a loss or vacancy of S or Se occurs frequently within the protective layer, the optical absorption will be degraded, or the layer will be opaque, and also presents a chemical instability, which are undesirable.

It is also desirable that the protective layer exhibits a Knoop hardness as determined according to JISZ 2251 which is equal to or greater than 300. The protective layer of the present invention thus obtained has a larger mechanical strength as compared to a known composite layer containing ZnS or ZnSe as the main component thereof. Further, the protective layer exhibits a high level of Jis Knoob hardness of more than 300 similar to those of oxides, and has a function of preventing cracks by generating microscopic slips. Furthermore, the protective layer has a lower compressive stress as compared to those oxides so that delamination is not likely to occur.

The protective layer is normally formed to have a thickness from 10 to 500 nm. If the thickness of the dielectric, protective layer is less than 10 nm, the effect of preventing a deformation of the substrate or recording layer will be insufficient, and the protective layer may not serve its purpose. Over a thickness of 500 nm, internal stresses within the dielectric itself as well as a difference in elasticity between the protective layer and the substrate will be remarkable, whereby cracks are likely to occur. From the standpoint of productivity, it is undesirable that the thickness in the film is beyond 200 nm.

If there is a need to form a thick film beyond 200 nm, a portion ranging from 5 to 10 nm of the total film thickness which is located adjacent to the recording layer may be constructed as a protective film according to the invention while the remaining film thickness may comprise other dielectric materials. Nevertheless, if the adherence between them is poor, a delamination is likely to occur, and thus, a combination of both materials should be carefully selected. A combination which minimizes such problem will be to use a material of the same kind as the refractory compound of the group (2) which is contained in the composite protective film located adjacent to the interface between the same and the recording layer.

The recording medium of the invention may also include a reflecting layer. It is desired to use a metal of a high reflectivity and a high thermal conductivity for the material of the reflecting layer. Examples of the metal specifically include Au, Ag, Al and the like. However, to increase the latitude in the optical design, a semiconductor such as Si or Ge may also be employed. From economic aspect and from the standpoint of corrosion resistance, an Al alloy having from 0.5 to 5.0 at. % of Ta, Ti, Cr, Mo, Mg, Zr, V or Nb added to Al is desirable. In particular, the addition of Ta increases the corrosion resistance.

EXAMPLE 8

MgS selected from the group (1) and SiO$_2$ selected from the refractory compound of group (2) were admixed in powder form in a molar ratio of 40 to 60 to provide a material for a dielectric layer, which was then subjected to a hot press process to produce a composite target.

A recording medium comprising a four layer structure including a dielectric layer, a recording layer, another dielectric layer and a reflecting layer having thicknesses of 200 nm, 30 nm, 30 nm and 100 nm, respectively, was formed on top of a polycarbonate resin substrate. The composition of the recording layer was Ge$_2$Sb$_2$Te$_5$, and Al alloy was used for the reflecting layer.

Flowing Ar gas at a flow rate of 50 sccm, a dielectric film was formed by a sputtering process at a high frequency of 13.56 MHz and under a pressure of 0.7 Pa. The film had a density of 2.4 g/cc, which is equivalent to 98% of the theoretical bulk density. The film exhibited JIS Knoop hardness of 480 and had a tensile film stress of $1.1 \times 10^8$ dyn/cm$^2$. The recording layer and the reflecting layer were both formed by a d.c. sputtering process under Ar gas pressure of 0.7 Pa. Additionally, about 5 $\mu$m thick ultraviolet ray cured resin was applied.

The disc was initialized by using an Ar ion laser, or in other words, processed to cause a crystallization of the recording layer. Subsequently, the dynamic characteristic of the disc was evaluated under the conditions mentioned below.

Specifically, while rotating the disc at a linear velocity of 10 m/s, an overwrite operation was repeated using a pulse radiation having a frequency of 4 MHz and a duty cycle of 50% at a recording power Pw of 19.5 mW and the erase power Pe of 9.5 mW. Each time a given number of repetitions was completed, C/N ratio and an erasure ratio were determined.

Figure 17:
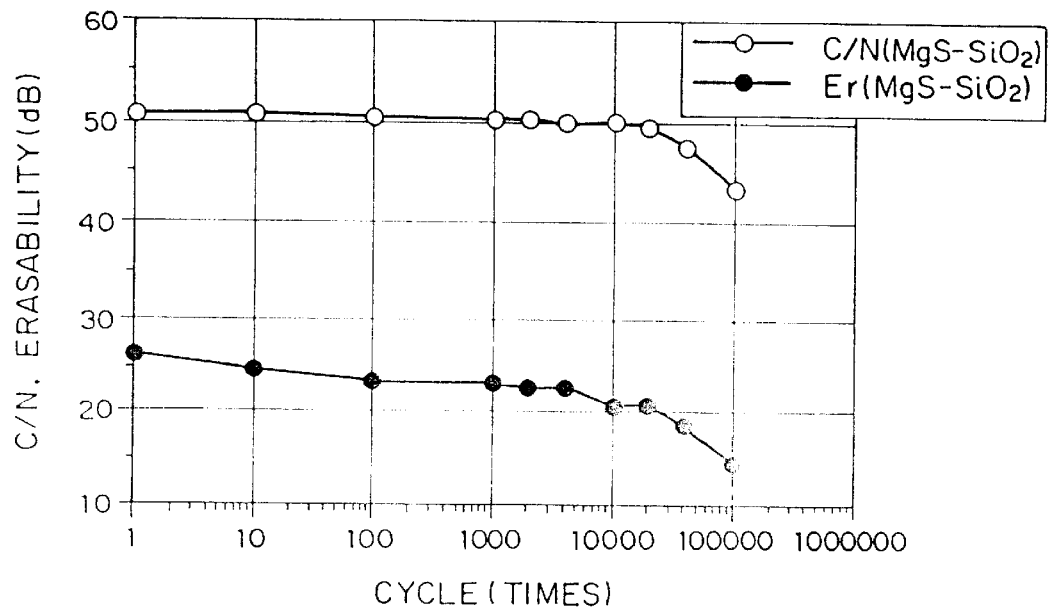
FIG. 17 is a graph showing dependency of C/N ratio and erasability upon repetition of overwriting in Example 8.

As will be evident from FIG. 17, after 100,000 repetitions, the C/N ratio dropped by about 7 dB as compared with the initial C/N ratio. The erasability dropped by about 12 dB after 100,000 repetitions as compared with the initial erasability. It is to be noted that the melting temperature of SiO$_2$ was about 1,600° C., and the compressive stress was $3 \times 10^8$ dyn/cm$^2$.

EXAMPLE 9

Figure 18:
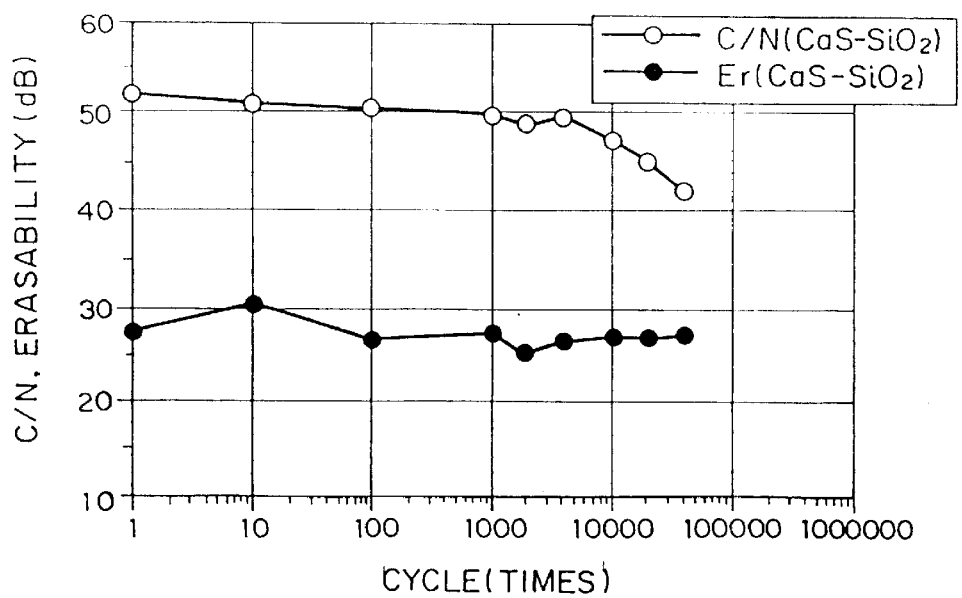
FIG. 18 is a graph showing dependency of C/N ratio and erasability upon repetition of overwriting in Example 9.

A disc was prepared in a manner similar to that described in Example 8 except that, in the present example, a material for the protective layer comprised CaS from the group (1) and $SiO_2$ from the group (2) which were mixed together at a molar ratio of 40 to 60 in powder form, and the bottom protective layer had a film thickness of 160 nm. A result of the evaluation of the similar dynamic characteristic is shown in FIG. 18. After 40,000 repetitions, the C/N ratio dropped by about 10 dB as compared with the initial C/N ratio. The erasability dropped by about 1 dB after 40,000 repetitions as compared with the initial erasability. This dielectric thin film exhibited a Knoop hardness of 480, and exhibited a compressive stress of $4 \times 10^8$ $dyn/cm^2$.

EXAMPLE 10

To provide a material for a protective layer, $La_2S_3$ from the group (1) and $SiO_2$ as a refractory compound from the group (2) were admixed in powder form at a molar ratio of 80 to 20, and the mixture was subjected to a hot press process to provide a composite sintered target.

A recording medium having a four layer structure including a dielectric layer, a recording layer, another dielectric layer and a reflecting layer having thicknesses of 170 nm, 30 nm, 30 nm and 100 nm, respectively, was formed on top of a polycarbonate resin substrate. The composition of the recording layer again comprised $Ge_2Sb_2Te_5$, and the reflecting layer comprised Al alloy.

Flowing Ar gas and an oxygen gas at a flow rate of 50 sccm and 1.0 sccm, respectively, the dielectric layer was formed by a sputtering process at a high frequency of 13.56 MHz and under a pressure of 0.7 Pa. The film had a density of 4.3 g/cc, which is equivalent to 88% of the theoretical density. The film exhibited JIS Knoop hardness of 415, and a tensile stress of $1.3 \times 10^8$ $dyn/cm^2$. The recording layer and the reflecting layer were both formed by a d.c. sputtering process under an Ar gas pressure of 0.7 Pa. Additionally, an ultraviolet ray cured resin, about 5 µm thick, was applied.

While rotating the disc at a linear velocity of 10 m/s, an overwrite operation was repeated using a pulse radiation having a frequency of 4 MHz and a duty cycle of 50% at a recording power Pw of 13.5 mW and an erase power Pe of 7.0 mW. Each time a given number of repetitions was reached, the C/N ratio and the erasability were determined.

Figure 19:
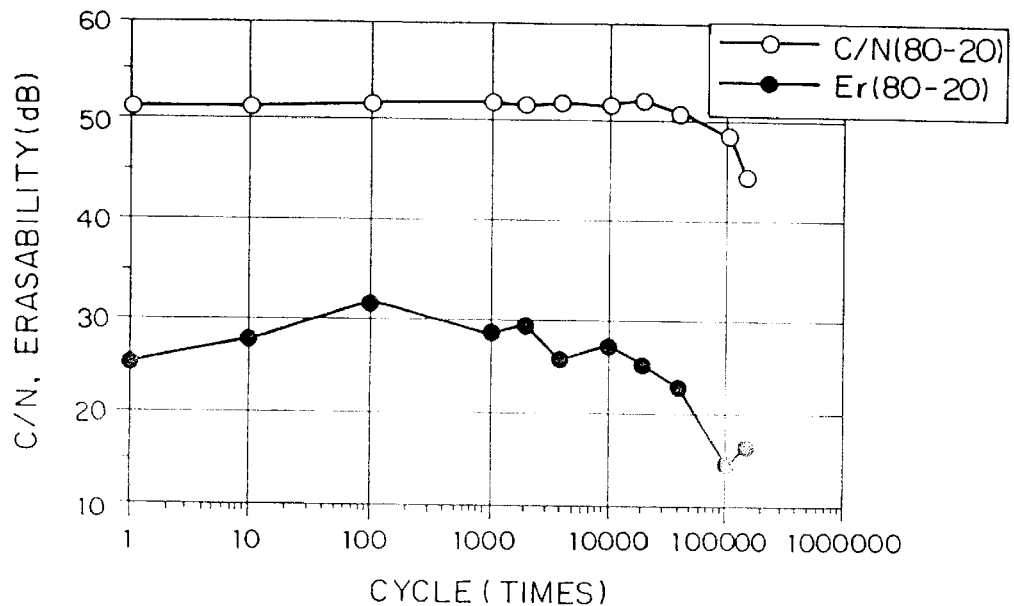
FIG. 19 is a graph showing dependency of C/N ratio and erasability upon repetition of overwriting in Example 10.

As will be evident from FIG. 19, the C/N ratio dropped by about 2 dB after 100,000 repetitions as compared with the initial C/N ratio while the erasability dropped by about 10 dB after 100,000 repetitions as compared with the initial erasability. It is to be noted that the melting temperature of $SiO_2$ was about 1,600° C. and exhibited a compressive stress of $3 \times 10^9$ $dyn/cm^2$.

EXAMPLE 11

Figure 20:
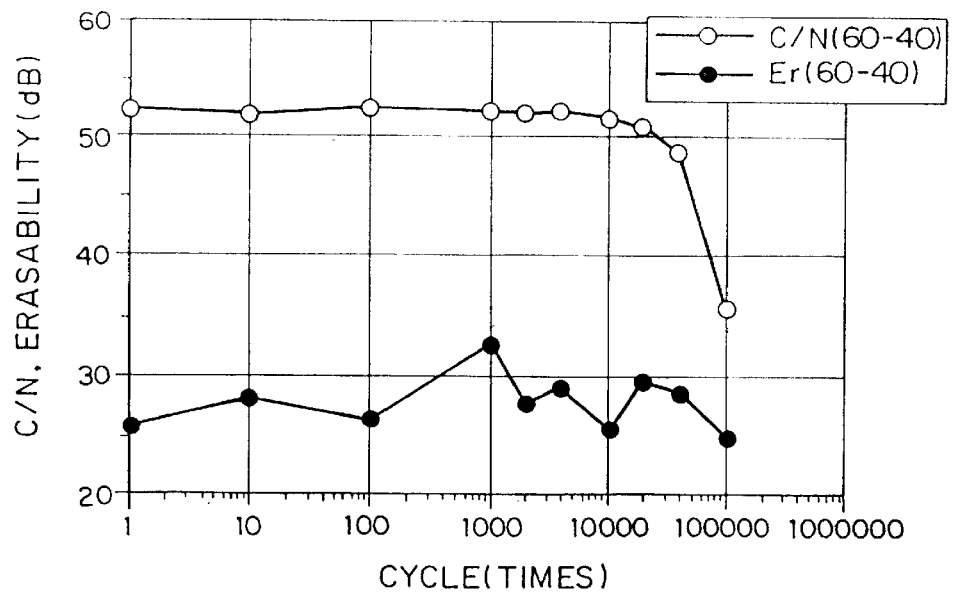
FIG. 20 is a graph showing dependency of C/N ratio and erasability upon repetition of overwriting in Example 11.

A disc was formed in a manner similar to that described in Example 10 except that the molar ratio of $La_2S_3$ and $SiO_2$ was replaced by 60:40, and the similar evaluation of the dynamic characteristic was conducted. The results are illustrated in FIG. 20. After 40,000 repetitions, the C/N ratio dropped about 4 dB as compared with the initial C/N ratio while the erasability remained substantially unchanged from the initial erasability after 100,000 repetitions. The thin film of this dielectric material exhibited Knoop hardness of 470 and a tensile stress of $1 \times 10^9$ $dyn/cm^2$. After examining the mixture ratio for the protective layer, it was found that a degradation caused by 10,000 repetitions of the overwrite operation could be substantially suppressed by a choice of an amount of $SiO_2$ which ranged from 10 to 90 mol %.

EXAMPLE 12

Figure 21:
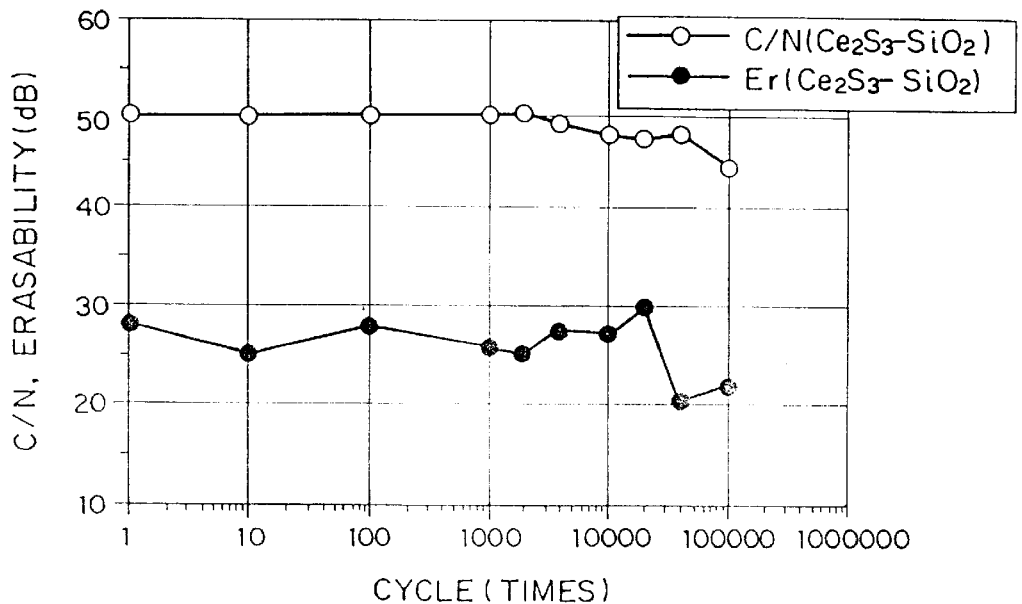
FIG. 21 is a graph showing dependency of C/N ratio and erasability upon repetition of overwriting in Example 12.

A disc was formed in a manner similar to that described in Example 8 except that a material for the dielectric layer was replaced by a combination of $Ce_2S_3$ and $SiO_2$ in a molar ratio of 20:80 and that the thickness of the bottom protective layer was changed to 190 nm. A similar evaluation of the dynamic characteristic was then made, and the result is illustrated in FIG. 21. As shown, the C/N ratio dropped by about 6 dB as compared with the initial C/N ratio after 100,000 repetitions while the erasability dropped by about 6 dB as compared with the initial erasability after 100,000 repetitions. The dielectric film exhibited Knoop hardness of 410 and a compressive stress of $3 \times 10^8$ $dyn/cm^2$. By examining the mixture ratio for the protective layer, it was found that a degradation caused by 10,000 repetitions of the overwrite operation could be substantially suppressed by a choice of an amount of $SiO_2$ which ranged from 15 to 90 mol %.

EXAMPLE 13

To provide a material for the dielectric layer, $TaS_2$ from the group (1c) and $Y_2O_3$ as the oxide from the group (2) were admixed in powder form at a molar ratio of 20 to 80, and the mixture was subjected to a hot press process to provide a composite sintered target.

A recording medium having a four layer structure including a dielectric layer, a recording layer, another dielectric layer and a reflecting layer having thicknesses of 150 nm, 30 nm, 30 nm and 100 nm, respectively, is formed on top of a polycarbonate resin substrate. The composition of the recording layer was again $Ge_2Sb_2Te_5$, and a reflecting layer comprised Al alloy.

Flowing Ar gas at a flow rate of 50 sccm, the dielectric layer was formed into a film by a sputtering process at a high frequency of 13.56 MHz and under a pressure of 0.7 Pa. The film density was found to be 5.2 g/cc, which is equivalent to 96% of the theoretical density. The film exhibited JIS Knoop hardness of 640 and a tensile stress of $-1.0 \times 10^8$ $dyn/cm^2$. The recording layer and the reflecting layer were formed by a d.c. sputtering process under an Ar gas pressure of 0.7 Pa. Additionally, a ultraviolet ray cured resin was provided which was about 5 µm thick.

While rotating the disc at a linear velocity of 10 m/s, an overwrite operation was repeated using a pulse radiation having a frequency of 4 MHz and a duty cycle of 50% at a recording power Pw of 18.5 mW and an erase power Pe of 8.5 mW. Each time a given number of repetitions was reached, the C/N ratio and the erasability were determined.

Figure 22:
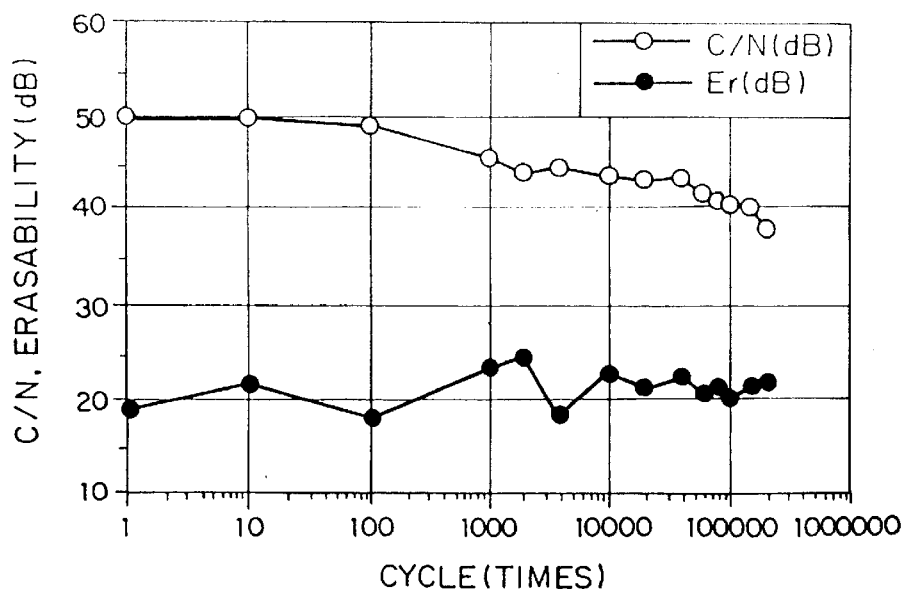
FIG. 22 is a graph showing dependency of C/N ratio and erasability upon repetition of overwriting in Example 13.

As will be evident from FIG.22, the C/N ratio dropped by about 10 dB after 100,000 repetitions. However, the erasability remained at substantially the same level as the initial erasability after 200,000 repetitions. It is to be noted that the melting temperature of $Y_2O_3$ was about 2,400° C. and the protective layer exhibited a Knoop hardness of 800 and a compressive stress of $2 \times 10^9$ $dyn/cm^2$. By examining the mixture ratio of the protective layer, it was found that a degradation caused by 10,000 repetitions of overwrite operation could be substantially suppressed by a choice of an amount of $Y_2O_3$ which ranged from 30 to 90 mol %.

EXAMPLE 14

Figure 23:
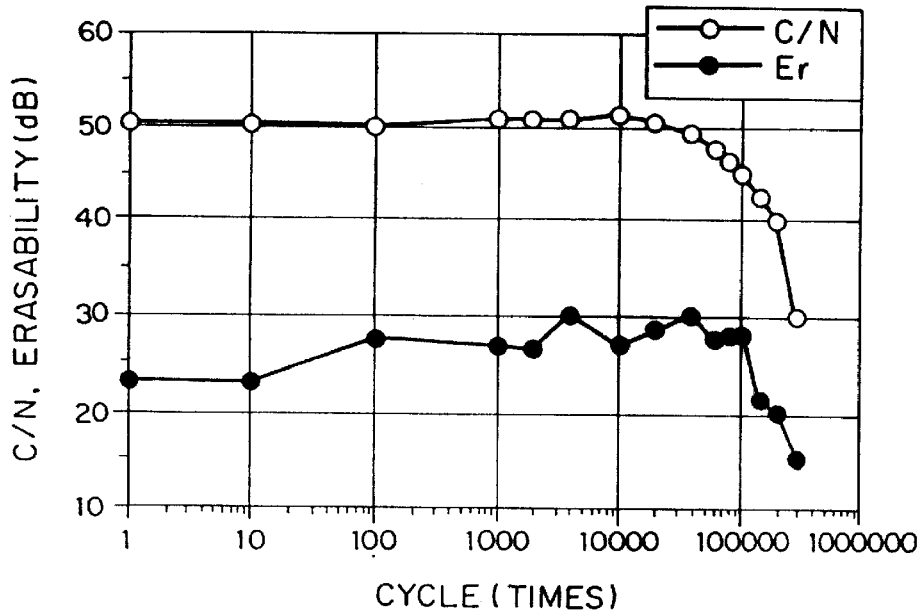
FIG. 23 is a graph showing dependency of C/N ratio and erasability upon repetition of overwriting in Example 14.

A disc was formed in a manner similar to that described in Example 13 except that a material for the dielectric layer in the present example comprised $TaS_2$ and $Ta_2O_5$ in a molar ratio of 20 to 80, and that the bottom protective layer in the present example had a thickness of 160 nm. A similar evaluation of dynamic characteristic was made, and the result is shown in FIG. 23. The C/N ratio dropped by about 5 dB as compared with the initial C/N ratio after 100,000 repetitions while the erasability increased by about 5 dB as compared with the initial erasability after 100,000 repetitions. It is to be noted that the protective layer exhibited a Knoop hardness of 440 and a compressive stress of $1\times10^9$ dyn/cm$^2$. The melting temperature of Ta$_2$O$_5$ was about 1,900° C. and it exhibited a Knoop hardness of 420 and a compressive stress of $5\times10^9$ dyn/cm$^2$. By examining the mixture ratio for the protective layer, it was found that a degradation caused by 10,000 repetitions of the overwrite operation could be substantially suppressed by a choice of an amount of Ta$_2$O$_5$ which ranged from 30 to 90 mol %.

EXAMPLE 15

Figure 24:
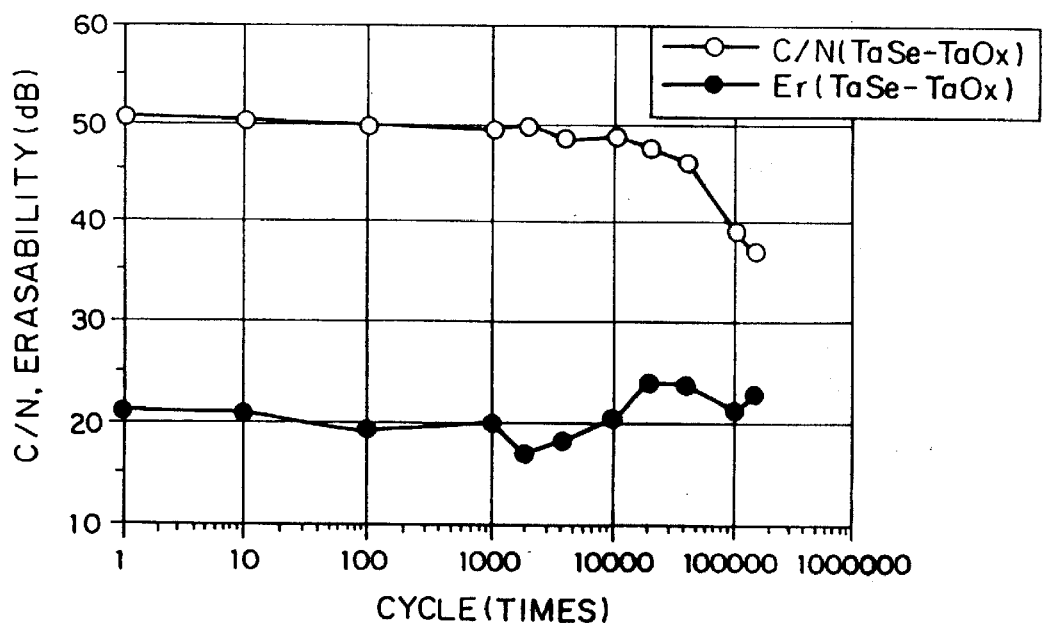
FIG. 24 is a graph showing dependency of C/N ratio and erasability upon repetition of overwriting in Example 15.

A disc was formed in a manner similar to that described in Example 14 except that a material for the dielectric layer comprised TaSe$_2$ and Ta$_2$O$_5$ in molar ratio of 20 to 80 in the present example. A similar evaluation of dynamic characteristic was made, with results shown in FIG. 24. The C/N ratio dropped by about 13 dB as compared with the initial C/N ratio after 150,000 repetitions while the erasability remained substantially unchanged from the initial erasability even after 100,000 repetitions. This dielectric film exhibited a Knoop hardness of 480 and a compressive stress of $3.7\times10^9$ dyn/cm$^2$. By examining the mixture ratio for the protective layer, it was found that a degradation caused by 10,000 repetitions of the overwrite operation could be substantially suppressed by a choice of an amount of Ta$_2$O$_5$ which ranged from 30 to 90 mol %.

EXAMPLE 16

A disc is formed in a manner similar to that described in Example 8 except that a material for the dielectric layer in the present example comprised ZrS$_2$ and Ta$_2$O$_5$ in molar ratio of 80 to 20, that the thickness was changed to 140 nm for the bottom dielectric layer, 20 nm for the recording layer, 20 nm for the top dielectric layer and 200 nm for the reflecting layer, and that the composition of the recording layer was In$_{15}$Sb$_{60}$Sn$_{25}$. The resulting disc was used as an optical disc of write-once type by rotating the same at a linear velocity of 9.5 m/s while writing a signal into the disc using a pulse radiation having a frequency of 4 MHz and a duty cycle of 50% at a recording power of 10 mW. After the writing, the disc is stored in a high temperature, high humidity bath maintained at temperature of 80° C. and humidity of 80% for 500 hours. When the disc is removed from the bath and the film surface is examined under an optical microscope, no physical damages such as bulges or cracks were found. There was no change in the signal responses of the disc such as the C/N ratio or jitter.

EXAMPLE 17

A material for the dielectric layer was provided by selecting TaS$_2$ from the group (1c) and a Ta target as a refractory compound from the group (2). A recording medium was prepared having a four-layer structure including a dielectric layer, a recording layer, another dielectric layer and a reflecting layer having thicknesses of 160 nm, 30 nm, 30 nm and 100 nm, respectively, and disposed sequentially on top of a polycarbonate resin substrate. The recording layer had a composition comprising Ge$_2$Sb$_2$Te$_5$, while the reflecting layer comprised Al alloy.

Flowing Ar gas and oxygen gas at flow rates of 50 sccm and 6 sccm, respectively, the dielectric layer was formed, by simultaneously conducting a high frequency (13.56 MHz) sputtering for TaS$_2$ target and a d.c. sputtering for the Ta target, under pressure of 0.7 Pa. The power level used during the sputtering of respective TaS$_2$ and Ta targets were adjusted such that a resulting film contained TaS$_2$ and Ta$_2$O$_5$ in a molar ratio of 20 to 80. The film density was 7.4 g/cc, which is equivalent to 87% of the theoretical density. The film exhibited JIS Knoop hardness of 440 and a compressive stress of $1\times10^9$ dyn/cm$^2$. Both the recording layer and the reflecting layer were formed by a d.c. sputtering under Ar gas pressure of 0.7 Pa. Additionally, a ultraviolet ray cured resin, which was about 5 μm thick, is provided. The disc thus obtained was initialized using Ar ion laser to produce a crystallization of the recording layer. Subsequently, dynamic characteristic of the disc was evaluated under the conditions mentioned below. Rotating the disc at a linear velocity of 10 m/s, an overwrite operation is repeated, using a pulse radiation of 4 MHz and having a duty cycle of 50% at a recording power level Pw of 20 mW and an erase power level Pe of 9.5 mW. Each time a given number of repetitions was reached, C/N ratio and the erasability were determined.

Figure 25:
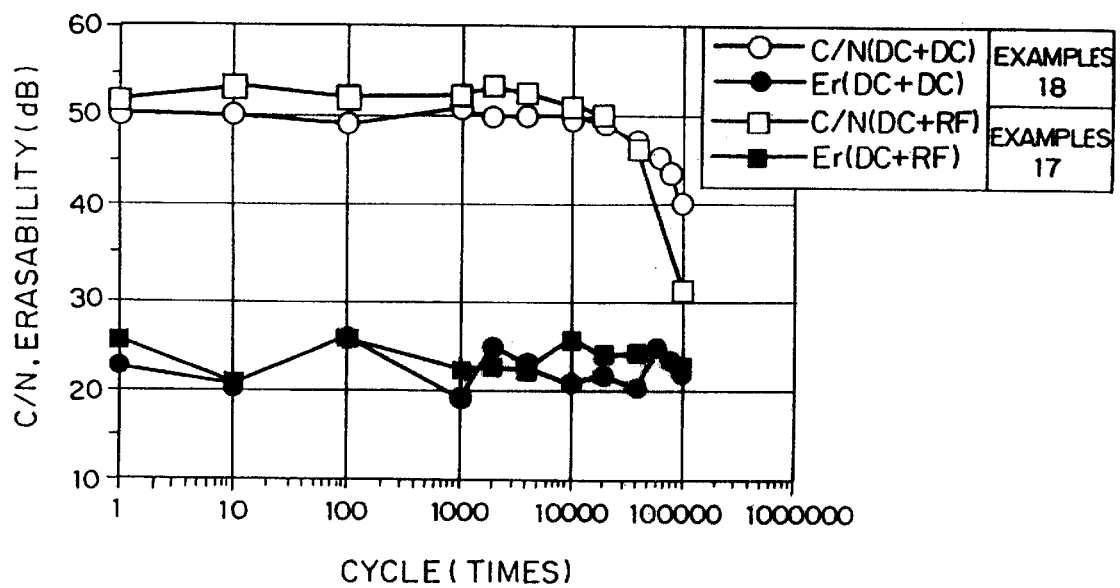
FIG. 25 is a graph showing dependency of C/N ratio and erasability upon repetition of overwriting in Examples 17 and 18.

Results are shown in FIG. 25. It will be apparent from this Figure that C/N ratio dropped about 20 dB as compared with the initial C/N ratio after 100,000 repetitions while the erasability remained substantially at the same level as at the initial erasability after 100,000 repetitions.

EXAMPLE 18

A disc was formed in a manner similar to that described in Example 17 except that a d.c. sputtering from TaS$_2$ target and Ta target was conducted concurrently, and a similar evaluation of dynamic characteristic was made. Results are shown in FIG. 25. After 100,000 repetitions, the C/N ratio dropped about 10 dB as compared with the initial erasability. No significant change is noted in the erasability as compared with the initial overwrite operation after 100,000 repetitions. The dielectric film exhibited a density of 7.4 g/cc, which is equivalent to 87% of the theoretical density. The film exhibited JIS Knoop hardness of 440, and a compressive stress of $1\times10^9$ dyn/cm$^2$.

Comparative Sample 3

A disc was formed in a manner similar to that described in Example 8 except that a material for the dielectric layer in this sample comprised only SiO$_2$, and a similar evaluation of dynamic characteristic was made. After 10,000 repetitions, the C/N ratio and the erasability dropped by about 11 dB and 17 dB, respectively, as compared with the initial values. The dielectric film exhibited a Knoop hardness of 300 and a compressive stress of $1\times10^9$ dyn/cm$^2$.

Comparative Sample 4

Figure 26:
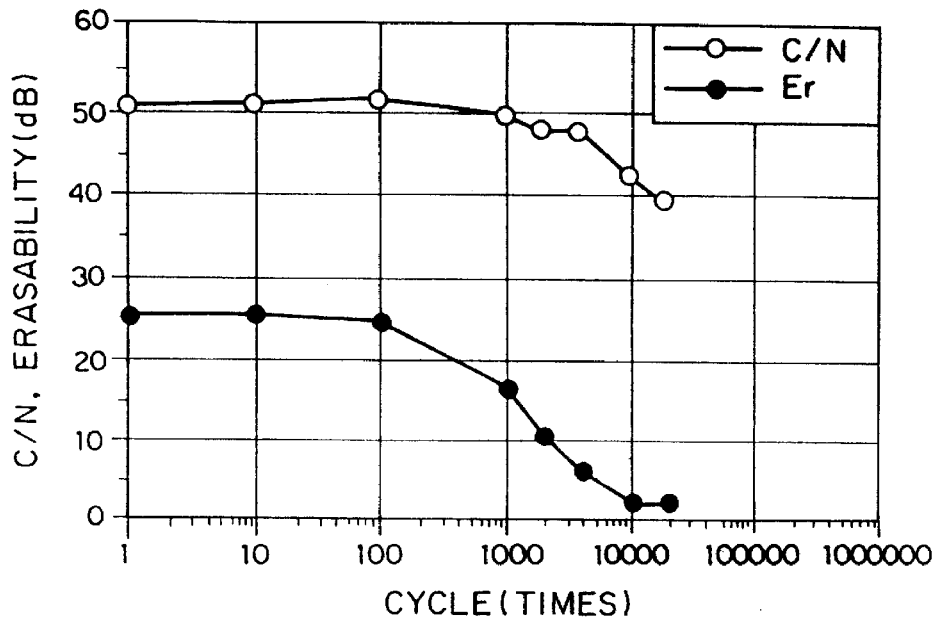
FIG. 26 is a graph showing dependency of C/N ratio and erasability upon repetition of overwriting in Comparative Sample 4.

A disc was formed in a manner similar to that described in Example 8 except that a material for the dielectric layer in this sample comprised only Ta$_2$O$_5$, and a similar evaluation of dynamic characteristic was made. Results are shown in FIG. 26. After 20,000 repetitions, the C/N ratio and the erasability dropped by about 11 dB and about 25 dB, respectively, as compared with the initial values.

Comparative Sample 5

Figure 27:
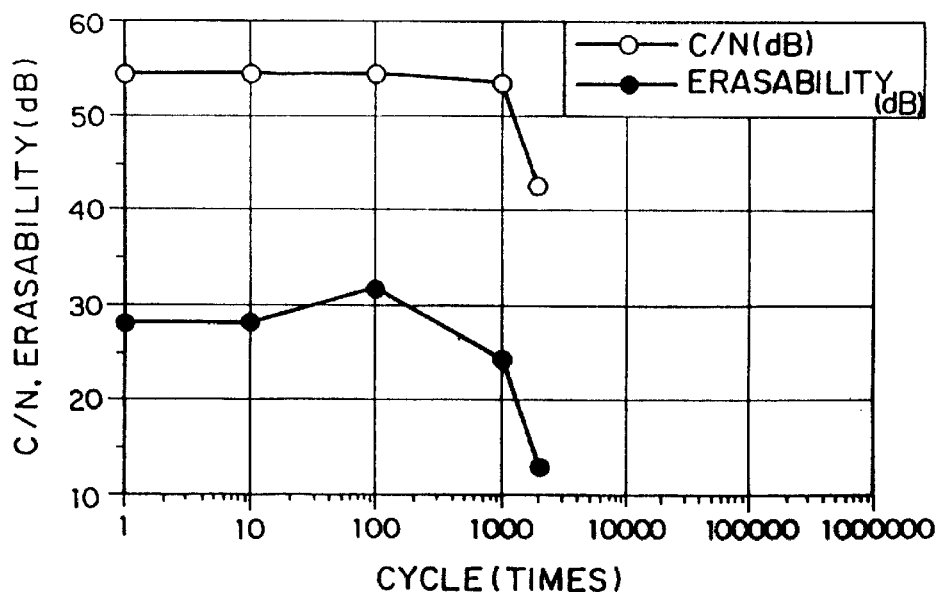
FIG. 27 is a graph showing dependency of C/N ratio and erasability upon repetition of overwriting in comparative Sample 5.

A disk was formed in a manner similar to that described in Example 8 except that a material for dielectric layer in this sample comprised ZnS and TiO$_2$ in molar ratio of 80 to 20, and the similar evaluation of dynamic characteristic was made. Results are shown in FIG. 27. After 2,000 repetitions, the C/N ratio and the erasability dropped by about 11 dB and about 16 dB, respectively, as compared with the initial values. The dielectric film exhibited a Knoop hardness of 500 and a compressive stress of $2 \times 10^9$ dyn/cm$^2$. It is known that TiO$_2$ begins to experience a thermal decomposition around 600° C., causing oxygen atoms to be released and producing a color change into the black.

Comparative Sample 6

Figure 28:
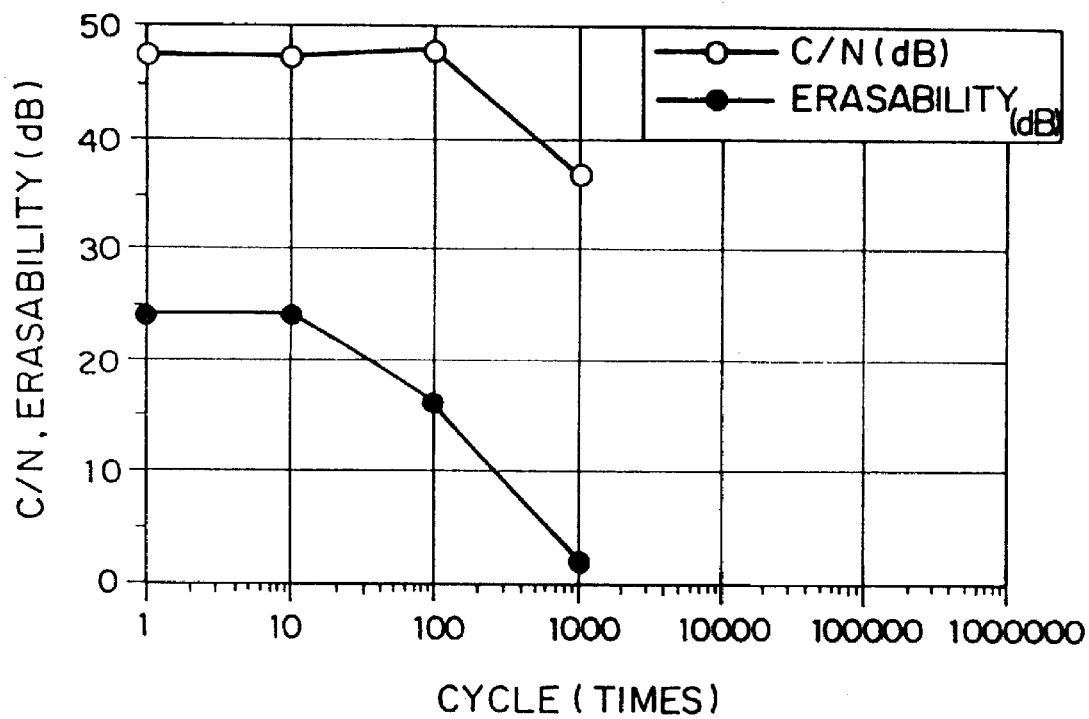
FIG. 28 is a graph showing dependency of C/N ratio and erasability upon repetition of overwriting in Comparative Sample 6.

A disk was formed in a manner similar to that described in Example 8 except that a material for the dielectric layer in this sample comprised ZnS and MoS$_2$ in molar ratio of 80 to 20, and a similar evaluation of dynamic characteristic was made. Results are shown in FIG. 28. After 1,000 repetitions, the C/N ratio and the erasability dropped by about 9 dB and about 16 dB, respectively, as compared with the initial values. The dielectric film exhibited a Knoop hardness of 220 and a compressive stress of $1 \times 10^8$ dyn/cm$^2$. It is known that MOS$_2$ is thermally unstable at around 350° C., and thus prone to form an alloy.

The following Example 18 for the recording method according to the present invention was performed using an optical disc drive tester (Type DDU1000 from Pulsetech) including a 780 mm wavelength laser diode and a NA=0.55 optical lens, thereby recording test signals by one-beam overwriting. Reading optical power Pb was maintained at a constant of 0.8 mW independently of different linear velocities. Evaluation was made using EFM random pattern at a single, double and quadruple speeds of a CD speed (1.2–1.4 m/s). Clock period T was set at 116 nanosecond, which corresponds to the double speed and the period used in current CDs. After several overwriting operations under suitable conditions, reproduced signals were sliced at the central level of the peak-to-peak signal amplitude from the 11 T mark in the respective reproduced signals, so as to detect respective mark lengths in the reproduced signals. Timing interval analyzer (TIA) of E1725A and the method as used for Example 1 were used again in this Example. Each of the recording discs had a diameter of 120 mm, which is similar to that of a CD, and was formed on a polycarbonate resin substrate which had a spiral groove thereon having a pitch of 1.6 μm. Erase power Pe is selected such that the difference between a carrier level of a residue signal for a 11 t mark and a carrier level of a 3 T mark is more than 20 dB after a mark recorded by a 22 T single period (duty cycle of 50%) is overwritten by another mark using a 6 T single period (duty cycle of 50%).

Disc A of the Example was prepared by consecutively forming a 100 nm thick (ZnS)$_{80}$(SiO$_2$)$_{20}$ [mol %] protective layer, 25 nm thick Ge$_{22.0}$Sb$_{25.0}$Te$_{53.0}$[at %] recording layer, 20 nm (ZnS)$_{80}$(SiO$_2$)$_{20}$ [mol %] protective layer and a 100 nm thick Al alloy layer by using magnetron sputtering, followed by forming a 4 μm thick ultra-violet cured resin layer. Disc B of the Example was prepared similarly to Disc A except that the recording layer of B was made of AgInSbTe. Those two alloys for the recording layers are popular for the materials for the recording layer of a rewritable disc of phase change type, and have respective advantages and disadvantages so that it is difficult to determine in the current technique which is superior to the other. Those alloys for the recording layers, however, exhibit different characteristics in dependency on the linear velocities due to respective processes in phase-change between crystallized and amorphous states. Accordingly, in the prior art, those alloys are not interchangeable in CD-E discs in a broad linear velocity ranging between a single speed and a quadruple speed, although the interchangeability can be maintained within a specified velocity.

Table 1 shows excellent results obtained in this Example, in which recording operations at single, double and quadruple speeds were executed to both Discs A and B by using different divided pulse techniques dependent on the linear velocities. The term "excellent results" as used herein are such that a clear eye pattern is obtained in an EFM random pattern and the jitter of the smallest mark length, i.e., of a 3 T mark is less than 10% of the period T. The divided pulse patterns as used in this Embodiment were those shown in FIG. 9. In this Example, a maximum linear velocity V$_h$ was selected at a quadruple speed, m was selected at m=n−1, and reading power Pb was selected at Pb=Pr that was maintained constant independently of the liner velocity. For Disc A, as apparent from Table 1, single to quadruple speeds for V presented excellent results in recording when Vh was at a quadruple speed.

It is shown in this Example that excellent marks can be recorded on both Discs A and B if $\alpha_1$, $\alpha_i$ (for i:2≤i≤m), $\beta_i$ (for i:1≤i≤m−1), $\beta_m$, θ, Pw and Pe are selected for each linear velocity at respective values as specified in Table 1. In each of the cases, a divided pulse technique should be employed in which at least one of α and θ is reduced for a lower linear velocity.

If the above signals are recorded as special information in ATIP signal, the special information can be retrieved by disc drives of the prior art such as described in Japanese Patent Laid-Open Publications No. 103,454/1988, No. 87,344/1990, No 198,040/1990, No. 88,124/1991, No. 237,657 and After-Exam. Publication No. 3,168/1991. The circuit configuration for generating divided pulse patterns such as shown in Table 1 in a single drive can be also implemented by a combination of the prior art techniques. As mentioned before, the preferred technical features of the present invention reside in divided pulse techniques in which $\alpha_i$, ($\beta_i$) and/or θ is varied to obtain interchangeability of a recording medium of phase change type, the divided pulse technique being recorded on the recording medium itself.

EXAMPLE 19

To provide a material for a protective layer, Ce$_2$S$_3$ from the group (1) and ZnO as a refractory compound from the group (2) were admixed in powder form at a molar ratio of 20 to 80, and the mixture was subjected to a hot press process to provide a composite sintered target.

A recording medium having a four layer structure including a dielectric layer, a recording layer, another dielectric layer and a reflecting layer having thicknesses of 200 nm, 20 nm, 20 nm and 200 nm, respectively, was formed on top of a polycarbonate resin substrate. The composition of the recording layer again comprised Ag$_{6.8}$In$_{7.1}$Te$_{28.6}$Sb$_{57.5}$, and the reflecting layer comprised Al alloy.

Flowing Ar gas at a flow rate of 50 sccm, respectively, the dielectric layer was formed by a sputtering process at a high frequency of 13.56 MHz and under a pressure of 0.7 Pa. The film had a density of 5.1 g/cc, which is equivalent to 96% of the theoretical density. The film exhibited JIS Knoop hardness of 45.0, and a tensile stress of $4 \times 10^9$ dyn/cm$^2$. The recording layer and the reflecting layer were both formed by a d.c. sputtering process under an Ar gas pressure of 0.7 Pa. Additionally, an ultraviolet ray cured resin, about 5 μm thick, was applied.

While rotating the disc at a linear velocity of 56 m/s, an overwrite operation was repeated using a pulse radiation having a frequency of 2.24 MHz and a duty cycle of 50% at a recording power Pw of 14 mW and an erase power Pe of 6.5 mW. Each time a given number of repetitions was reached, the C/N ratio and the erasability were determined.

The C/N ratio was almost same after 100,000 repetitions as compared with the initial C/N ratio and the erasability was almost same after 100,000 repetitions as compared with the initial erasability. It is to be noted that the melting temperature of ZnO was about 1,980° C.

To summarize, an optical recording medium according to the invention can be effectively utilized in implementing a medium of write-once type which exhibits an excellent data saving stability and also a medium of overwrite type which permits a multiplicity of repetitions of recording and erasure.

TABLE 1

|  | single speed | double speed | quadruple speed |
|---|---|---|---|
| Disc A | $\alpha_1 = 0.52, \alpha = 0.20$ | $\alpha_1 = 1.00, \alpha = 0.45$ | $\alpha_1 = 1.00, \alpha = 0.50$ |
| m = n − 1, Pb = Pr = 0.8mW | $\beta = 0.80, \beta_m = 0.50$ | $\beta = 0.55, \beta_m = 0.50$ | $\beta = 0.50, \beta_m = 0.00$ |
| constant | Pw = 14mW, Pe = 5mW | Pw = 14mW, Pe = 6mW | Pw = 15mW, Pe = 6mW |
| Disc B | $\alpha_1 = 1.00, \alpha = 0.17$ | $\alpha_1 = 1.00, \alpha = 0.31$ | $\alpha_1 = 1.00, \alpha = 0.35$ |
| m = n − 1, Pb = Pr = 0.8mW | $\beta = 0.83, \beta_m = 0.50$ | $\beta = 0.69, \beta_m = 0.50$ | $\beta = 0.65, \beta_m = 0.00$ |
| constant | Pw = 11mW, Pe = 5mW | Pw = 12mW, Pe = 5mW | Pw = 13mW, Pe = 7mW |
| Disc A | $\alpha_1 = 1.00, \alpha = 0.20$ | $\alpha_1 = 1.00, \alpha = 0.50$ | $\alpha_1 = 1.00, \alpha = 0.50$ |
| m = n − 2, single | $\beta = 0.80, \beta_m = 0.50$ | $\beta = 0.50, \beta_m = 0.50$ | $\beta = 0.50, \beta_m = 0.00$ |
| m = n − 1, double, quadruple | Pw = 14mW, Pe = 5mW<br>Pb = Pr = 0.8mW | Pw = 14mW, Pe = 6mW<br>Pb = Pr = 0.8mW | Pw = 15mW, Pb = Pe = 6mW |

Since above embodiments are described only for examples, the present invention is not limited to such embodiments and it will be obvious for those skilled in the art that various modifications or alterations can be easily made based on the above embodiments within the scope of the present invention.

What is claimed is:

1. In an optical recording process for recording data in or erasing data from an optical information recording medium through a formation or erasure of optically distinguishable amorphous marks by irradiating laser radiation having laser power modulated by at least three levels in accordance with a clock period T, said process including the steps of:

providing a linear velocity V ranging between $V_L$ and $V_h$ on an optical recording medium, said clock period T being varied in accordance with said linear velocity V;

irradiating with a focussed laser beam to record a mark having an nT mark length on the optical recording media in an mark-length modulation recording; and modulating the laser radiation to have m individual pulses each having a recording power level Pw and a pulse duration $\alpha_i T$, with an interval $\beta_i T$ provided between corresponding two of said pulse durations for providing a bias power level $Pb_i$, the i representing integers 1 to m, whereby obtaining a time sequence of $\alpha_1 T, \beta_1 T, \alpha_2 T, \beta_2 T, \ldots \alpha_m T$ and $\beta_m T$ for the laser power, the improvement wherein said recording process includes the step of changing at least one of a combination of $\alpha_i T$'s and $Pb_i$ in accordance with the linear velocity V on condition that the following inequality and equalities are satisfied:

$$n_{min} - k \geq 1;$$

$$m = n - k;$$

and $$\alpha_1 + \beta_1 + \ldots + \alpha_m + \beta_m = n - j,$$

wherein k and j represent an integer which satisfies $0 \leq k \leq 2$ and a real number which satisfies $0 \leq j \leq 2$, respectively, and wherein $n_{min}$ represents a minimum value of the n.

2. An optical recording process according to claim 1 wherein a clock period T is substantially selected to T=Th*($V_h/V$) for a linear velocity V, $T_h$ representing a clock period for the linear velocity $V_h$, wherein T may remain constant for small variations of V and Vh in the range of ±10% of V.

3. An optical recording process according to claim 1 wherein a ratio of $Pb_i/Pe=\theta_i$ is changed in accordance with the linear velocity V, wherein Pe represents a erasure power level used during erasing the mark.

4. An optical recording process according to claim 3 wherein $\alpha_{iL} \leq \alpha_{i1} \leq \alpha_{i2} \leq \alpha_{ih}$ and $\theta_{iL} \leq \theta_{i1} \leq \theta_{i2} \leq \theta_{ih}$ hold for any i and $V_1$ and $V_2$ which satisfy $V_L < V_1 < V_2 < V_h$, in which $\alpha_{iL} T, \alpha a_{i1} T, \alpha_{i2} T$ and $\alpha_{ih} T$ represent the widths of individual pulses at linear velocities of $V_L, V_1, V_2$ and $V_h$, respectively, and $\theta_{iL}, \theta_{i1}, \theta_{i2}$ and $\theta_{ih}$ represent the ratio $Pb_i/Pe=\theta_i$ at linear velocities of $V_L, V_1, V_2$ and $V_h$, respectively, at least at $V_L$, either $\alpha_{iL} < \alpha_{ih}$ or $\theta_{iL} < \theta_{ih}$ holds.

5. An optical recording process according to claim 4 wherein:

a maximum linear velocity $V_h$ ranges from 2 to 6 times a minimum linear velocity $V_L$ which satisfies $1.2 \leq V_L \leq 1.4$ m/s in an eight-to-fourteen modulation;

m=n, n−1 or n−2;

a linear velocity V assumes $V_L, 2V_L, 4V_L$ or $6V_L$;

at any linear velocity V, $\alpha_i + \beta_{i-1} = 1.0$ holds for any i which satisfies $2 \leq i \leq m$;

at any linear velocity V, $Pb_i = Pr \pm 0.5$ mW holds for any i which satisfies $1 \leq i \leq m$ wherein Pr represents a reproducing power level; and $\alpha_i$ is reduced monotonically for any i which satisfies $1 \leq i \leq m$, as the linear velocity is reduced.

6. An optical recording process according to claim 5 wherein $\beta_m$ is not equal to zero.

7. An optical recording process according to claim 4 wherein at a maximum linear velocity $V_h, \alpha_{1h} = 1.5$ or 1.0, and $\beta_{1h} = \alpha_{1h} = 0.5$ for i which satisfies $2 \leq i \leq m$, and at any linear velocity, $\alpha_i + \beta_i = 1.0$ for i which satisfies $2 \leq i \leq m$, $\alpha_{ih} T$ and $\beta_{ih} T$ representing the width of each of individual pulses and corresponding interval at the maximum linear velocity $V_h$.

8. An optical recording process according to claim 7 wherein for a linear velocity V which satisfies the relationship $V_L \leq V < V_h$, inequality:

$$\alpha_1 < \alpha_{ih} \text{ and } 0.05 < \alpha_i < 0.5$$

hold for any i which satisfies $2 \leq i \leq m$.

9. An optical recording process according to claim 4 wherein $\alpha_1 > \alpha_i$ holds for any i which satisfies $2 \leq i \leq m$, and $\alpha_i$ remains constant for any i which satisfies $2 \leq i \leq m$.

10. An optical recording process according to claim 4 wherein which $\beta_i$ remains constant for any i which satisfies $1 \leq i \leq m$ while $\beta_m$ assumes a value different from the constant and including zero.

11. An optical recording process according to claim 4 wherein a range of the n used in a mark length modulation recording technique varies in accordance with a linear velocity used during a recording operation of the mark.

12. An optical recording process according to claim 11 wherein $n_{min}T*V$ remains constant for at least a shortest mark length $n_{min}T$.

13. An optical recording process according to claim 4 wherein:

a maximum linear velocity $V_h$ ranges from 2 to 6 times a minimum linear velocity $V_L$ ranging between 1.2 and 1.4 m/s in an eight-to-fourteen modulation;

$m=n$, $n-1$ or $n-2$;

a linear velocity V assumes $V_L$, $2V_L$, $4V_L$ or $6V_L$;

at a linear velocity V equal to or greater than $2V_L$, $\alpha_{1h}=1.5$ or 1.0 and $\beta_{1h}=\alpha_{ih}=0.5$ hold for any i which satisfies $1 \leq i \leq m$;

at any linear velocity V, $\alpha_i+\beta_{i-1}=1.0$ holds for any i which satisfies $2 \leq i \leq m$;

at a linear velocity $V=2V_L$, $Pb_i=Pr\pm 0.5$ mW holds for any i which satisfies $1 \leq i \leq m$ wherein Pr represents a reproducing power level;

at a linear velocity $V=V_L$, $0.05<\alpha_i<0.5$ holds for any i which satisfies $2 \leq i \leq m$ and $\alpha_{1L} \leq \alpha_{1h}$ holds;

at a linear velocity $V_h$, $Pb_i$, $=Pe$ holds for any i which satisfies $1 \leq i \leq m$.

14. An optical recording process according to claim 13 wherein $\beta_m$ is not equal to zero.

* * * * *